(12) United States Patent
Guagenti et al.

(10) Patent No.: US 8,418,064 B2
(45) Date of Patent: Apr. 9, 2013

(54) SYSTEMS AND METHODS FOR DISPLAYING NODE INFORMATION IN WIRELESS NETWORKS

(75) Inventors: Mark A. Guagenti, Huntsville, AL (US); David B. Ewing, Madison, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 405 days.

(21) Appl. No.: 12/437,977

(22) Filed: May 8, 2009

(65) Prior Publication Data
US 2010/0077286 A1    Mar. 25, 2010

Related U.S. Application Data

(60) Provisional application No. 61/099,453, filed on Sep. 23, 2008, provisional application No. 61/105,692, filed on Oct. 15, 2008, provisional application No. 61/107,213, filed on Oct. 21, 2008.

(51) Int. Cl.
*G06F 17/00* (2006.01)

(52) U.S. Cl. ........ 715/734; 715/205; 715/733; 715/735; 715/736; 715/737; 715/738; 715/742; 715/744

(58) Field of Classification Search ............ 715/205, 715/733–738, 740, 742, 744
See application file for complete search history.

(56) References Cited

U.S. PATENT DOCUMENTS

| | | | | |
|---|---|---|---|---|
| 5,860,008 | A  * | 1/1999 | Bradley | 717/137 |
| 6,370,687 | B1 * | 4/2002 | Shimura | 717/146 |
| 6,859,831 | B1 | 2/2005 | Gelvin et al. | |
| 6,912,715 | B2 | 6/2005 | Gao et al. | |
| 7,047,536 | B1 | 5/2006 | Duncan et al. | |
| 7,328,243 | B2 | 2/2008 | Yeager et al. | |
| 7,406,401 | B2 | 7/2008 | Ota et al. | |
| 7,593,752 | B2 | 9/2009 | Ara et al. | |
| 7,676,805 | B2 | 3/2010 | Yu et al. | |
| 7,788,970 | B2 | 9/2010 | Hitt et al. | |
| 7,813,910 | B1 | 10/2010 | Poulin | |
| 7,817,047 | B1 | 10/2010 | Brignone et al. | |
| 7,924,150 | B2 | 4/2011 | Baldus et al. | |

(Continued)

OTHER PUBLICATIONS

Microsoft Windows Screenshots; 2007; Microsoft Corporation; Microsoft Windows XP Version 5.1; pp. 1-5.*

(Continued)

*Primary Examiner* — Doug Hutton, Jr.
*Assistant Examiner* — Andrew Dyer
(74) *Attorney, Agent, or Firm* — Maynard Cooper & Gale, P.C.; Jon E. Holland

(57) ABSTRACT

The present disclosure generally pertains to systems and methods for displaying node information in wireless sensor networks. An exemplary system has logic that is configured to display a list of nodes in a wireless sensor network. The logic is further configured to display a plurality of function identifiers in response to a first user input identifying one of the nodes, and the function identifiers identify a plurality of functions and a script image of the one node. The logic is further configured to receive a second user input selecting one of the function identifiers and to transmit a remote procedure call through the wireless network to the one node in response to the second user input. The one node is configured to run the function or script image identified by the selected function identifier in response to the remote procedure call.

11 Claims, 10 Drawing Sheets

U.S. PATENT DOCUMENTS

| | | |
|---|---|---|
| 7,970,871 B2 | 6/2011 | Ewing et al. |
| 8,204,971 B2 | 6/2012 | Ewing |
| 2003/0058277 A1 | 3/2003 | Bowman-Amuah |
| 2004/0028023 A1 | 2/2004 | Mandhyan et al. |
| 2005/0071842 A1* | 3/2005 | Shastry .................. 718/100 |
| 2005/0129097 A1 | 6/2005 | Strumpf et al. |
| 2005/0157333 A1* | 7/2005 | Cho et al. ................ 358/1.15 |
| 2005/0216885 A1 | 9/2005 | Ireland |
| 2006/0031426 A1 | 2/2006 | Mesarina et al. |
| 2006/0098594 A1 | 5/2006 | Ganesh |
| 2006/0126501 A1 | 6/2006 | Ramaswamy |
| 2006/0282498 A1 | 12/2006 | Muro |
| 2007/0250930 A1 | 10/2007 | Aziz et al. |
| 2007/0291689 A1 | 12/2007 | Kapur et al. |
| 2008/0111885 A1 | 5/2008 | Voglewede et al. |
| 2008/0137624 A1 | 6/2008 | Silverstrim et al. |
| 2008/0150360 A1 | 6/2008 | Vezza et al. |
| 2008/0229415 A1 | 9/2008 | Kapoor et al. |
| 2009/0209291 A1* | 8/2009 | Ramprasad et al. ......... 455/564 |
| 2010/0074143 A1 | 3/2010 | Ewing |
| 2011/0099126 A1 | 4/2011 | Belani et al. |

OTHER PUBLICATIONS

Microsoft Computer Dictionary; May 1, 2002; Microsoft Press; Fifth Edition; pp. 330, 714.*

* cited by examiner

SYSTEMS AND METHODS FOR DISPLAYING NODE INFORMATION IN WIRELESS NETWORKS

CROSS REFERENCE TO RELATED APPLICATIONS

This application claims priority to U.S. Provisional Patent Application No. 61/099,453, entitled "Systems and Methods for Controlling Wireless Sensor Networks," and filed on Sep. 23, 2008, which is incorporated herein by reference. This application also claims priority to U.S. Provisional Patent Application No. 61/105,692, entitled "Systems and Methods for Controlling Wireless Sensor Networks," and filed on Oct. 15, 2008, which is incorporated herein by reference. This application claims priority to U.S. Provisional Patent Application No. 61/107,213, entitled "Systems and Methods for Controlling Wireless Networks," and filed on Oct. 21, 2008, which is incorporated herein by reference.

RELATED ART

The proliferation of applications using wireless communication is increasing as more and more users seek solutions that provide increased mobility and flexibility. However, wireless communication has numerous challenges and problems. For example, since wireless signals are transmitted through free space, data collisions with other wireless signals from foreign networks can occur. Further, the effects of various noise sources and even weather can have a more pronounced effect on wireless communication as compared to communication occurring over physical media. Moreover, wireless communication in particularly noisy environments, such as manufacturing plants, can be quite problematic.

Further, in implementing a wireless network, such as a Wireless Sensor Network (WSN), various protocols need to be established and techniques for overcoming some of the aforementioned challenges for wireless communication are necessary. In addition, the functionality and interaction of the nodes of the network can be relatively complex, particularly for wireless networks in which data communication may be unreliable at times due to varying environmental conditions and noise levels. Moreover, engineering a wireless sensor network can be extremely expensive and burdensome.

Techniques for reducing the cost and burden of designing and developing networks, such as wireless sensor networks, are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for controlling wireless networks. In one exemplary embodiment of the present disclosure, a wireless network has a plurality of nodes. The nodes have predefined functions and a network stack that allow communication among the nodes and that allow the network to perform basic functions, such as pushing tokenized scripts from one node to another. Thus, by writing scripts and uploading the scripts to various nodes, as may be desired, a user of the network is able to dynamically configure the nodes to perform any desired function for an intended application without having to implement and debug a design for the wireless communication among the nodes. Indeed, it is unnecessary for the user to have any knowledge of the underlying communication operations that transport data among the nodes. By eliminating the need of the user to design a wireless communication solution for his intended application and subsequent changes to his intended application, the process of implementing a wireless network and changing its behavior over time is greatly simplified.

In one exemplary embodiment, each node of the network has a network stack and a virtual machine. The network stack is configured to packetize messages for communication across the network. The messages may include scripts capable of running on the virtual machine of any node. Thus, in implementing a wireless network, a user may define a script for performing a desired function and push the script from one node to another node such that the receiving node is able to execute the script to perform the desired function. Further, the network stacks within the network handle the communication of the script through the network such that it is unnecessary for the user pushing the script over the network to have any knowledge of the underlying communication operations that transport the script from one node to the next. Thus, the user is able to dynamically change the behavior of any node within the network by simply writing a script and submitting a request for the script to be uploaded to a desired node. The process of communicating the script to the node through the network and implementing the function on the desired node is transparent to the user.

Figure 1:
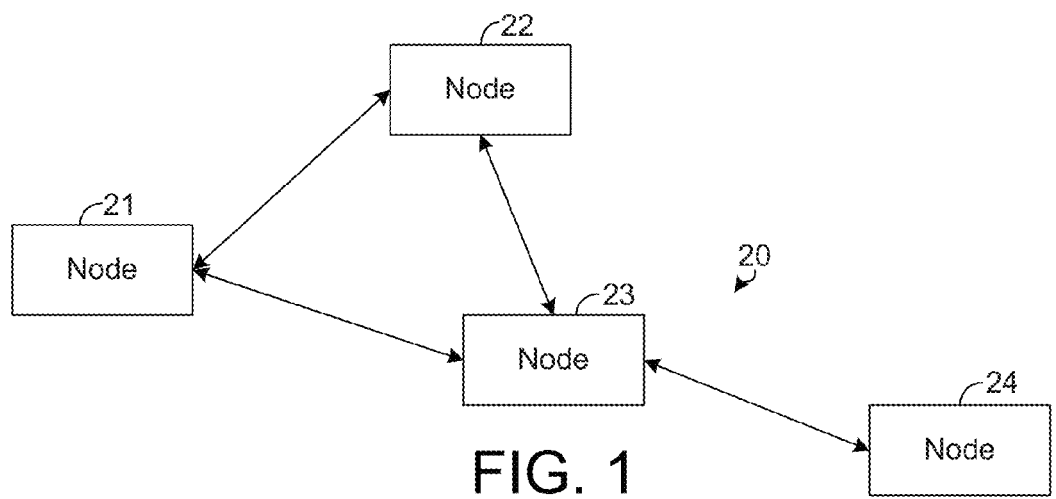
FIG. 1 is a block diagram illustrating an exemplary wireless network in accordance with the present disclosure.

FIG. 1 depicts a wireless sensor network 20 of an exemplary embodiment of the present disclosure. The network 20 has a plurality of nodes 21-24. FIG. 1 depicts four nodes 21-24 for simplicity, but the network 20 may have any number of nodes 21-24 in other embodiments. In one exemplary embodiment, the network 20 is implemented as a mesh network, but other types of networks may be implemented in other embodiments. Exemplary networks are described in U.S. patent application Ser. No. 12/114,566, entitled "Systems and Methods for Dynamically Configuring Node Behavior in a Sensor Network, and filed on May 2, 2008, which is incorporated herein by reference, and in U.S. Provisional Patent Application No. 60/974,836, entitled "Wireless Communication Networks," and filed on Sep. 24, 2007, which is incorporated herein by reference. Exemplary networks are further described in U.S. patent application Ser. No. 12/237,158, entitled "Systems and Methods for Adaptively Adjusting Codec Rates for Communication Networks," and filed on Sep. 24, 2008, which is incorporated herein by reference, and in U.S. patent application Ser. No. 12/237,192, entitled "Systems and Methods for Reducing Data Collisions in Wireless Network Communications," and filed on Sep. 24, 2008, which is incorporated herein by reference.

Each node 21-24 is able to communicate with any of the other nodes 21-24. In one exemplary embodiment, the nodes 21-24 communicate among one another wirelessly, but it is possible for any of the nodes 21-24 to communicate with any of the other nodes 21-24 over a conductive medium. Messages may hop from node-to-node in order to reach a destination. For example, in the exemplary embodiment shown by FIG. 1, the nodes 21-23 are within range of each other such that any of the nodes 21-23 can communicate directly with any of the other nodes 21-23. However, the node 24 is only within range of node 23. The other nodes 21 and 22 can use node 23 to route a message to node 24. In this regard, each node 21-24 has a routing table that indicates routes for messages. As known in the art, routing tables can be created and updated via a variety of techniques. In general, nodes communicate among one another to learn of data paths for various destinations. Once a path to a particular destination is discovered, the routing table or tables of the nodes along the path may be updated and later used to route a message to the destination.

Moreover, to enable the node 21 of network 20 to send a message to node 24, the node 21 may have a routing table indicating that such a message is to hop through the node 23. Thus, the node 21 inserts the address, referred to as the "hop address," of the next hop or, in other words, the next node to receive the message (i.e., node 23 in this example), as well as the address, referred to as the "destination address," of the node (i.e., node 24 in this example) to ultimately receive and process the message. Based on the hop address, the routing node 23 receives the message and consults its routing table to determine where to route the message. In the instant example, the routing table indicates that a message destined for the node 24 can be transmitted directly to the node 24. Thus, the routing node 23 retransmits the message using the address of the node 24 as both the destination address and the hop address for the message. The node 24 receives the message and processes as appropriate. Thus, even though node 21 cannot communicate directly with the node 24, the node 21 can have the message routed through the network 20 to the node 24. The concept of routing messages through a mesh network using routing tables is generally well-known.

In general, there are at least two types of messages communicated by the network 20, unicast messages and multicast messages. A "unicast" message refers to a message that is destined for a specific node, referred to as the "destination" or "destination node." Such a message includes a destination address identifying the destination node. In general, a node in the network 20 does not respond to a unicast message unless the node is identified by either the destination address or a hop address in the message. Thus, if a node is not the destination node for a unicast message or within the data path for routing the message to its destination, the node does not respond to the unicast message but rather discards it upon reception.

In one exemplary embodiment, reliability of data communication is enhanced through the use of acknowledgements. That is, when a node ("receiving node") receives a unicast message transmitted from another node ("transmitting node"), the receiving node replies with an acknowledgment to the transmitting node. Thus, upon receipt of the acknowledgement, the transmitting node is aware that the unicast message has been received by the receiving node. If the transmitting node does not receive an acknowledgment within a predefined time period after transmission, then the transmitting node assumes that the unicast message failed to reach the receiving node and retransmits the unicast message. Note that each message includes the address of the transmitting node. In addition, an acknowledgement is sent for each respective hop along a data path. Thus, each node along the data path is able to ensure that the next hop has received the unicast message.

A "multicast" message, on the other hand, is a message destined for multiple nodes. In many cases, it is intended for a multicast message to be received and processed by every node in the network 24. Multicast messages are not communicated along predefined data paths indicated by the routing tables of the network nodes, and acknowledgments are not returned for multicast messages. Instead, a multicast message is generally rebroadcast by nodes that receive it regardless of whether such nodes are identified by the message.

In one exemplary embodiment, each multicast message includes a value, referred to as a "time-to-live value," indicating the number of times that the message is to be retransmitted. Each node that receives a multicast message is configured to retransmit the message as long as the time-to-live value is above a threshold, such as zero. However, before retransmitting the multicast message, the node decrements the time-to-live value. Thus, eventually, a node receives the multicast message after the time-to-live value has been decremented below the threshold and, therefore, does not retransmit the message. Accordingly, depending on the time-to-live value, a multicast message is rebroadcast through the network 20 for a limited time. Note that the same multicast message may be received by multiple nodes and retransmitted by each such node. Thus, after transmission of a multicast message, the message is repeatedly transmitted by other nodes through the network 20 for a finite period of time. In one exemplary embodiment, acknowledgments are not communicated for multicast messages, although the communication of acknowledgments is possible, if desired. Instead, it is assumed that each node of the network 20 has received the multicast message.

As an example, assume that a significant number of data collisions occur as the nodes are attempting communication on a particular channel. One of the nodes, sensing a high number of data collisions, may determine that communication is to be switched to a new channel. In such an example, the node may transmit a multicast message instructing the other nodes to switch to the new channel. Each node that receives the multicast message retransmits the message and begins communicating over the new channel as instructed. Eventually, the multicast message is received by each node of the network 20, and each such node, therefore, begins to communicate over the new channel. In other examples, other types of multicast messages may be communicated.

Figure 2:
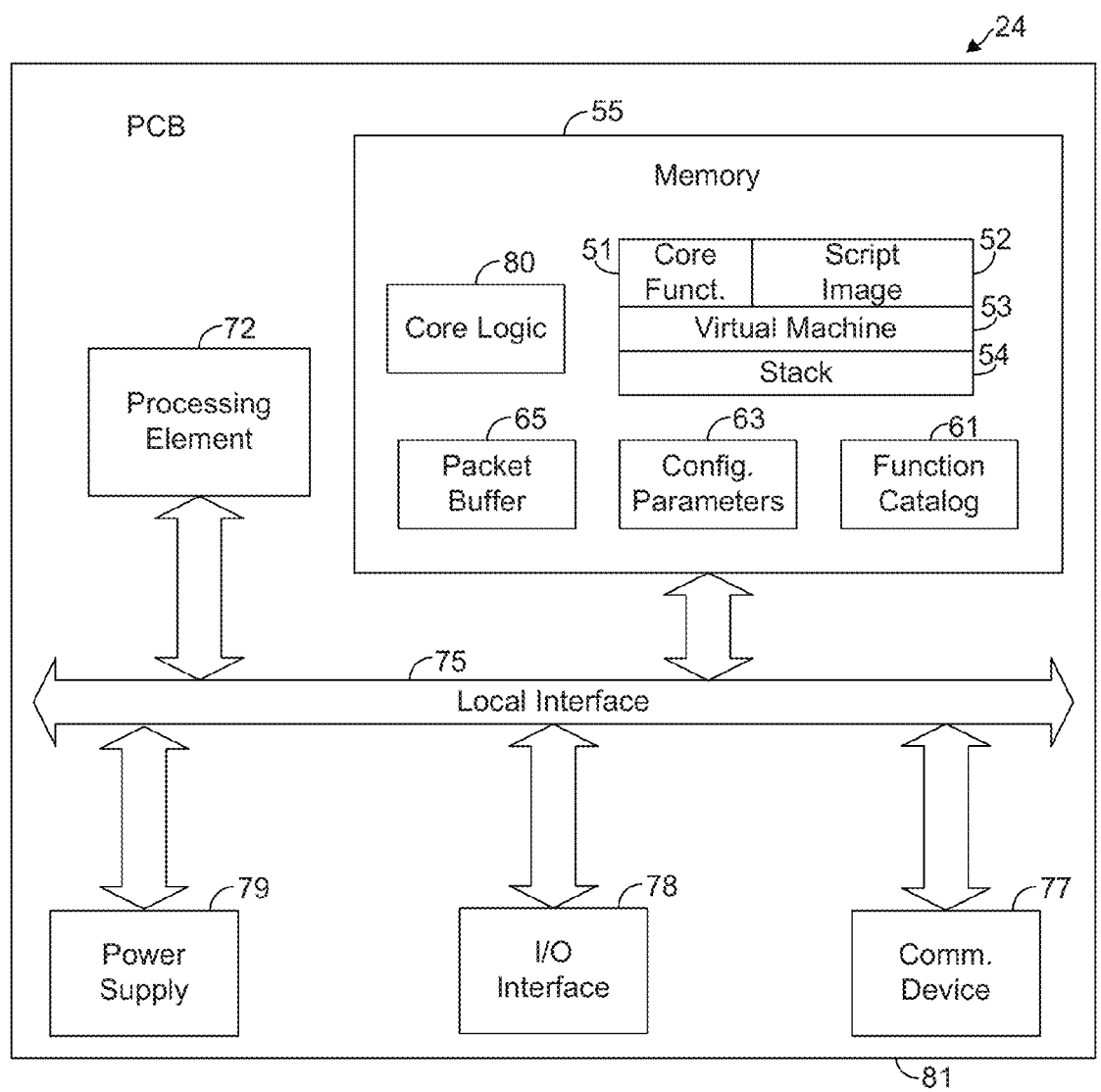
FIG. 2 is a block diagram illustrating an exemplary network node, such as is depicted in FIG. 1.

FIG. 2 depicts an exemplary embodiment of one of the nodes 24. Note that any of the other nodes 21-23 may be configured similarly to or identical to the node 24 depicted by FIG. 2. In the exemplary embodiment shown by FIG. 2, various software, including core functions 51, a script image 52, a virtual machine 53, and a network stack 54, are stored in memory 55. In other embodiments, portions of the components 51-54 may be implemented in firmware, hardware, or a combination of software, firmware, and/or hardware. Further, various data, such as a function catalog 61 and configuration parameters 63 are also stored in memory 55, and a portion of the memory 55 is used as a packet buffer 65 to buffer packets that have been communicated through the network 20 and received by the node 24.

Note that the core functions 51, the script image 52, the virtual machine 53, and the network stack 54, when implemented in software, can be stored and transported on any computer-readable medium for use by or in connection with an instruction execution apparatus that can fetch and execute instructions. In the context of this document, a "computer-readable medium" can be any means that can contain or store code for use by or in connection with the instruction execution apparatus.

The exemplary embodiment of the network node 24 depicted by FIG. 2 includes a processing element 72, which comprises processing hardware for executing instructions stored in memory 55. The processing element 72 communicates to and drives the other elements within the node 24 via a local interface 75, which can include at least one bus. Furthermore, a communication device 77 communicates with other nodes of the network 20. In one exemplary embodiment, the communication device 77 comprises an RF radio or other wireless communication device for communicating wireless signals with other nodes of the network 20.

The node 24 also has an input/output (I/O) interface 78 for enabling the node 24 to exchange data with other devices. For example, the I/O interface 78 may be coupled to a sensor (not shown) and receive data from the sensor. The I/O interface 78 may also be coupled to an apparatus (not shown), such as a motor or actuator, for performing an action under the direction and control of the script image 52 or other logic.

The node 24 is coupled to a power supply 79, which provides electrical power to the components of the node 24. In one exemplary embodiment, the power supply 79 comprises a battery. However, the power supply 79 may have an interface that allows the power supply 79 to plug into or otherwise interface with an external component, such as a wall outlet, and receive electrical power from such external component.

In one exemplary embodiment, each component shown by FIG. 2 resides on and is integrated with a printed circuit board (PCB) 81. However, in other embodiments, other arrangements of the node 24 are possible.

The stack 54 is configured to drive the communication device 77 and to handle network communication for the node 24. In this regard, when payload data is to be transmitted through the network 20, the network stack 54 is configured to packetize the payload data into at least one data packet and to wirelessly transmit the data packet from the node 24 via the communication device 77. When a data packet is received by the communication device 77, the packet is buffered in the packet buffer 65, and the stack 54 depacketizes the packet in order to recover the payload data. The network stack 54 is also configured to retransmit multicast messages and to ensure the reliable communication of unicast messages. In this regard, the stack 54 is configured to transmit acknowledgements, as appropriate, for received messages, and to ensure that acknowledgements are received for transmitted messages. If an acknowledgment is not received for a transmitted message in a timely manner, the network stack 54 is configured to initiate a retransmission of the message. Moreover, the operation of the stack 54 is transparent to the script image 52. For example, once the script image 52, which is running on the virtual machine 53, provides data to be transmitted to another node, the script image 52 can proceed with another task without handling or monitoring any part of the communication operations that are performed in order to reliably communicate the data to its destination. Moreover, the programmer of the script image 52 does not need to program the script image 52 to handle or monitor such communication operations.

In one exemplary embodiment, the virtual machine 53 is implemented as a bytecode interpreter. In this regard, the script image 52 comprise bytecode capable of being executed by the virtual machine 53. In one embodiment, the core functions 51 are written in the C computer language, and the script image 52 is written in the PYTHON computer language. However, other languages are possible in other embodiments.

Further, in one exemplary embodiment, the script image 52 is written by a user and uploaded to the node 24 over the network 20, as will be described in more detail hereafter. Each script image 52 includes at least one function having a function name that enables the function to be called by a function call, also referred to herein as a "procedure call." The script image 52 is user-defined and can be written to perform any desired functionality, such as monitoring or controlling devices external to the node 24, depending on the node's intended application.

The node 24 also has a plurality of predefined functions 51, referred to as the "core functions." Each core function 51 is associated with a function name that enables the function to be called by a function call. The core functions 51 enable a basic set of functionality that is likely to be useful regardless of the intended application of the node 24. For example, one of the core functions 51 may enable data to be written to or read from the memory 55. In another example, a core function 51 is used to store the script image 52 into memory 55. In another example, a core function 51 is used to set one or more of the configuration parameters 63. As will be described in more detail hereafter, the configuration parameters 63 are settings that control various aspects of the node's operation. Such configuration parameters 63 may be checked by the stack 54 or other node resources at run time to control various operations. Various other types of functionality may be performed by the core functions 51.

The name of each function, inclusive of the core functions 51 and the functions defined by the script image 52, is listed in a function catalog 61. The function catalog 61 comprises a listing of function names, and for each function name, the catalog 61 comprises a pointer that points to the address where the function is stored. Thus, when the virtual machine 53 executes a function call, the virtual machine 53 searches the function catalog 61 to find the matching function name. Once the matching name is found in the catalog 61, the associated pointer is used by the virtual machine 53 to locate and invoke the called function.

In one exemplary embodiment, the function catalog 61 is pre-sorted into some logical order so that it is unnecessary for the virtual machine 53 to check each function name in the catalog 61 before making a determination that a given function name is missing from the catalog 61. For example, in one exemplary embodiment, the function names in the catalog 61 are listed in alphabetical order. Thus, when the virtual machine 53 executes a function call, the virtual machine 53 implements an algorithm that efficiently finds, without checking every name in the catalog 61, the two function names in the catalog 61 that would immediately precede and follow the function name indicated by the function call. If the called function name is not between the located function names in the catalog 61, then the virtual machine 53 determines that the called function is not stored in the memory 55 and proceeds accordingly without checking the names of other functions in the catalog 61. If the called function name is between the located function names in the catalog 61, then the virtual machine 53 retrieves and executes the called function based on the associated pointer in the catalog 61. In other embodiments, the function catalog 61 can be pre-sorted in different ways, and it is unnecessary for the function catalog 61 to be pre-sorted in every embodiment. Pre-sorting the function catalog 61, however, can save processing time in finding a called function.

As shown by FIG. 2, the node 24 comprises core logic 80 for generally controlling the resources of the node 24. In one exemplary embodiment, the core logic 80 is firmware that runs on the processing element 72 independent of the virtual machine 53. However, other configurations of the core logic 80 are possible. For example, the core logic 80 can be implemented in hardware, software, firmware, or any combination thereof. The core logic 80 performs various basic control functions, such as interfacing data from the script image 52 or core functions 51 with hardware resources, such as the communication device 77 and/or I/O interface 78. Various other functionality may be performed by the core logic 80, which will be described in more detail hereafter.

In one exemplary embodiment, a virtual machine 53 is stored in each node of the network 20 so that any given script image 52 may be successfully executed on any node of the network 20, if desired. Exemplary techniques for defining the script images 52 and communicating the script images 52 through the network 20 will be described in more detail hereafter.

Note that running the script image 52 on a virtual machine 53 helps to isolate the script image 52 from the stack 54 such that the programmer of the script image 52 does not need to be concerned with how the stack 54 operates or when resources are consumed by the stack 54. Further, in one exemplary embodiment, various hardware resources allocated to the virtual machine 53 are not allocated to the stack 54 so that operation of the stack 54 can be separated from that of the virtual machine 53. For example, assume that the processing element 72 has multiple timers (not shown). Some of the timers are exclusively allocated to the virtual machine 53 relative to the stack 54 so that the stack 54 may not use these timers, and some of the timers are exclusively allocated to the stack 54 relative to the virtual machine 53 so that the virtual machine 53 may not use these timers. Various other hardware resources may be exclusively allocated to the stack 54 or virtual machine 53 in a similar manner. In utilizing the resources allocated to the virtual machine 53, it is unnecessary for the programmer of a script image 52, which runs on the virtual machine 53, to be concerned with the operation of the stack 54 since the stack 54 cannot consume such resources.

Thus, the programmer may write the script image 52 to perform any desired function without having knowledge of how the stack 54 handles communication with the network 20. Further, one of the core functions 51 may be to interface payload data with the stack 54 such that the stack 54 communicates the payload data through the network 20 to a destination. In such case, the programmer may simply include a function call for such function in the script image 52 being written and assume that the payload data will be successfully communicated upon execution of the function call without writing any code for handling or monitoring such communication. In this regard, the underlying operations for communicating the payload data over the network 20 are transparent to the script image 52 and, therefore, the programmer who is writing the script image 52.

Indeed, in one exemplary embodiment, a manufacturer of the network 20 provides a user (e.g., a purchaser) with all of the nodes 21-24. For each node 21-24, the components of the node reside on a PCB 81 that is small enough to be transported by hand to any desired location. Further, each node is supplied to the user with all of the components shown by FIG. 2 except for the script image 52, which is later written by the user and uploaded to the nodes 21-24 as appropriate depending on the intended application for the network 20. However, the core functions 51, the virtual machine 53, and the stack 54 provide the user with the ability to easily upload the script image 52 into any node without any understanding of how the stack 54 handles wireless communication over the network 20. Further, the configuration parameters 63 are set to certain default values and wireless communication is enabled at power up without the user having to upload any code into any of the node 21-24. Thus, the user may connect any of the nodes 21-24 to any apparatus to be controlled via the network 20 and/or any sensor to be monitored by the network 20. The user may also use the network 20 to wirelessly push the scripts 52 for controlling any such apparatus or monitoring any such sensor to any of the nodes 21-24 as may be desired. In this regard, without having any knowledge of the underlying communication enabled by the stack 54, the user can dynamically configure the behavior of any node 21-24 by generating a script image 52, which can include function calls for any of the core functions 51 or for any function defined by a script image 52 uploaded to a node.

In addition, as will be described in more detail hereafter, it is possible for any node 21-24 to use a remote procedure call to invoke a function stored on any of the other nodes of the network 20. As used herein a "remote" procedure call refers to any procedure call that is communicated from one node to another such that the procedure call is executed on a node that is remote from the one that originally transmitted the procedure call.

Figure 3:
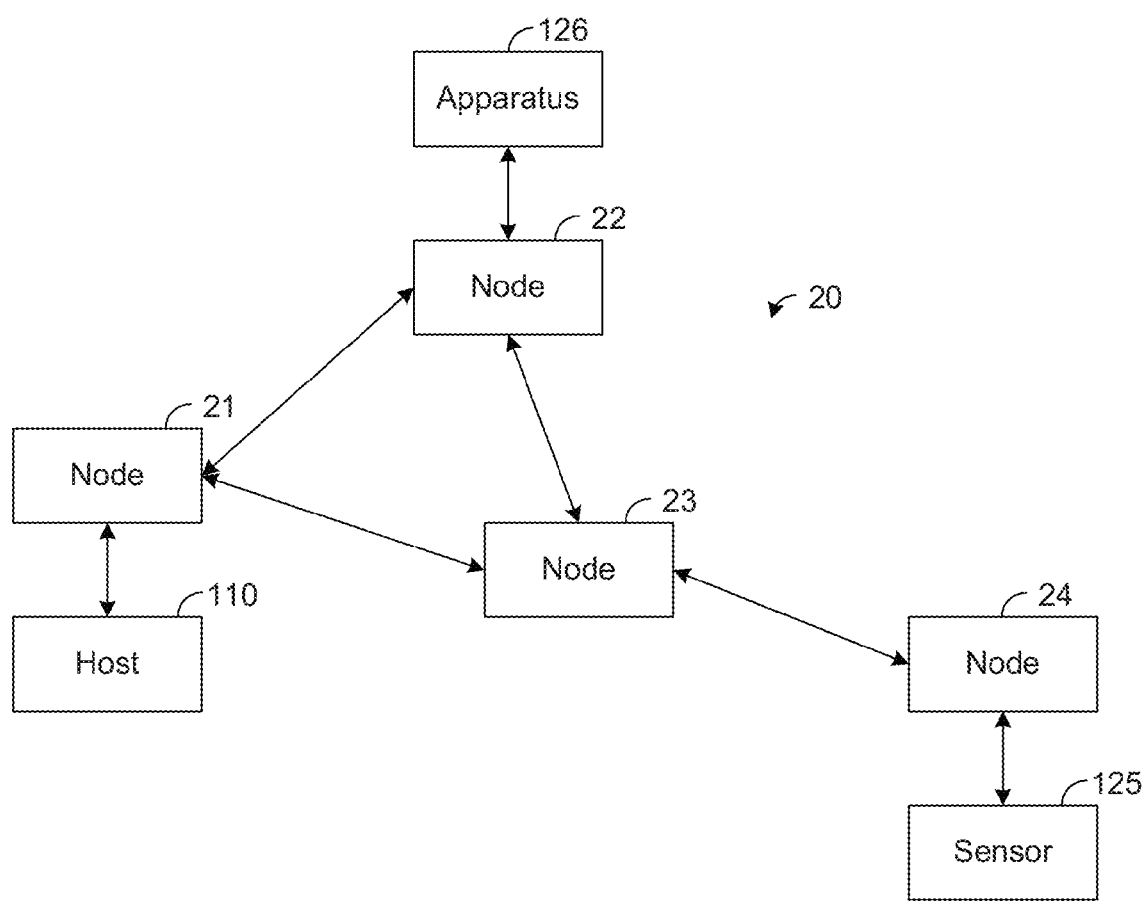
FIG. 3 is a block diagram illustrating an exemplary wireless network in accordance with the present disclosure.

To better illustrate the foregoing, assume that the node 24 is coupled to a sensor 125 and that the node 22 is coupled to an apparatus 126, as shown by FIG. 3. For illustrative purposes, assume that the sensor 125 is a switch that is activated when toggled by a user and that the apparatus 126 is a light source that is to emit light when the sensor 125 is activated. Further assume that the script image 52 stored at the node 24 includes a function, called "Check_Switch," that is configured to monitor the sensor 125 and determine when it is activated. Further assume that one of the core functions 51 of the node 24 named "RPC" is configured to transmit a remote procedure call message through the network 20. Also assume that a script image 52 at the node 22 includes a function called "Light_On" that, when executed, transitions the apparatus 126 into a state such that it emits light.

While running on the virtual machine 53 of node 24, assume that the Check_Switch function detects activation of the sensor 125. In response, the Check_Switch function is configured to call the RPC function 51 and, in the function call, to pass the name of the function to be called (i.e., "Light_On" in the instant example) and the address of the node 22. Thus, the RPC function is called by the virtual machine 53 of the node 24, and the RPC function causes an RPC message including the function name "Light_On" to be transmitted as a unicast message to the node 22.

Upon reception of the RPC message, the virtual machine 53 of the node 22 invokes the Light_On function based on the function name in the remote procedure call. In this regard, the RPC includes as payload data the function name "Light_On" and overhead information that identifies the message as an RPC. Thus, when executing the function call, the virtual machine 53 of node 22 searches the function catalog 61 for the name "Light_On" indicated by the payload data. Upon locating such name, the virtual machine 53 uses the associated pointer in the function catalog 61 to locate and then execute the Light_On function. When executed, the Light_On function changes the state of the apparatus 126 such that it begins emitting light. In a similar manner, a function at any node of the network 20 can be written to call a function stored at any other node. In other examples, other types of functionality could be enabled by the network 20.

As described above, the I/O interface 78 (FIG. 2) of any of the nodes 21-24 may be coupled to any external device. In one exemplary embodiment, at least one node 21-24 is coupled to a host that is used to upload at least one script image 52. For example, FIG. 3 depicts an exemplary embodiment in which the I/O interface 78 of the node 21 is coupled to a host 110. In one exemplary embodiment, the host 110 is a computer, such as a desk-top, lap-top, or hand-held computer, but other types of devices may be used to implement the host 110 in other embodiments. Further, the host 110 may be coupled to the node 21 via a conductive medium to allow data to be exchanged between the host 110 and the node 21. For example, the host 110 and node 21 could communicate over a communication connection via RS-232 protocols or other types of protocols. Alternatively, the host 110 may be configured to communicate with the node 21 via wireless signals.

Figure 4:
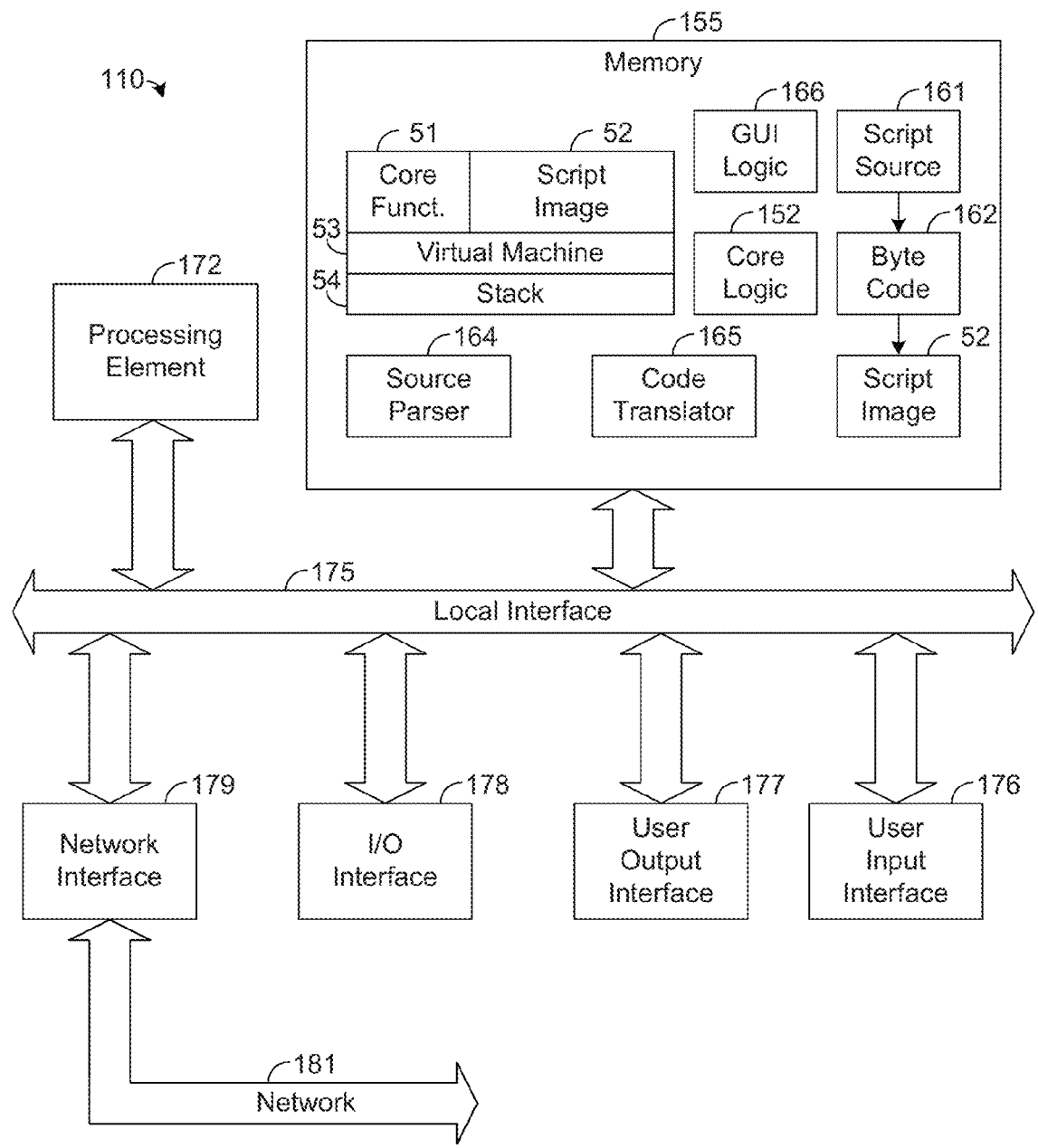
FIG. 4 is a block diagram illustrating an exemplary host, such as is depicted in FIG. 3.

FIG. 4 depicts an exemplary embodiment of the host 110. As shown by FIG. 4, the host 110 comprises host core logic 152 for generally controlling the operation of the host 110, as will be described in more detail below. It should be noted that the core logic 152 can be implemented in software, firmware, hardware, or any combination thereof. In the exemplary embodiment illustrated in FIG. 4, the core logic 152 is implemented in software and stored in memory 155 of host 110.

Various code, such as script source 161, bytecode 162, script image 52, a source parser 164, a code translator 165, and GUI logic 166 are also stored in memory. Note that, in other embodiments, at least portions of the source parser 164, code translator 165, and the GUI logic 166 can be implemented in hardware, firmware, or any combination of hardware, software, and firmware. When implemented in software, the core logic 152, the source parser 164, code translator 165, and the GUI logic 166 can be stored and transported on any computer-readable medium for use by or in connection with an instruction execution apparatus that can fetch and execute instructions.

The exemplary embodiment of the host 110 depicted by FIG. 4 comprises a processing element 172, which comprises processing hardware for executing instructions stored in memory 155. The processing element 172 communicates to and drives the other elements within the host 110 via a local interface 175, which can include at least one bus. Furthermore, a user input interface 176, for example, a keyboard or a mouse, can be used to input data from a user of the host 110, and a user output interface 177, for example, a display device (such as a liquid crystal display) or printer, can be used to output data to the user. Furthermore, an input/output (I/O) interface 178 enables the host 110 to communicate with external devices, such as node 21. For example, the I/O interface 178 may be conductively or otherwise communicatively coupled to the I/O interface 78 of node 21 or other device.

The host 110 also has a network interface 179 for enabling it to exchange data with a network 181, such as a wide area network (WAN) or local area network (LAN). As an example, the network interface 179 may be configured to communicate with the Internet via transmission control protocol/Internet protocol (TCP/IP).

When a user wishes to program a node of the network 20 to perform a desired function, the user writes script source 161 defining a script for execution by the node. In one exemplary embodiment, the script source 161 is source code that is written in PYTHON, but the script source 161 may be written in other languages, if desired. A conventional source parser 164 parses, compiles, and tokenizes the script source 161 to provide bytecode 162 capable of being executed. A code translator 165 translates the bytecode 162 into a script image 52 that can be transmitted to and run on the virtual machine 53 (FIG. 2) of any node of the network 20. In particular, the code translator 165 analyzes the bytecode 162 and performs various optimizations that make running of the script image 52 on an embedded virtual machine 53 more efficient.

As an example, the code translator 165 analyzes the bytecode 162 for global variables, which typically are stored in random access memory (RAM). The code translator 165 attempts to identify any variables in the bytecode 162 that are not changed at run time. For example, assume that the bytecode 162 has an instruction that initializes a value of the variable, but the bytecode 162 does not have an instruction for assigning a new value to the variable. In such a case, the value of the variable is not changed by the bytecode 162 after initialization. If the code translator 165 identifies such a variable, the translator 165 changes the data type from variable to constant in the script image 52. Further, the virtual machine 53 of each node is configured to store constants in a memory other than RAM, such as flash memory. Thus, variables that are re-classified as constants do not consume RAM, thereby helping to reduce the RAM size requirements. Other types of optimizations could be performed by the code translator 165.

The script image 52 provided by the code translator 165 is capable of running on the virtual machines 53, which are PYTHON bytecode interpreters in one exemplary embodiment. The host core logic 152 is configured to transmit the script image 52 to the node 21 along with the node address or addresses of the network node or nodes on which the script image 52 is to be stored and executed. If the node 21 is identified, the script image 52 is stored in memory 55 of the node 21. For example, one of the core functions 51 may be a process for storing a script image 52 in memory 55. As part of this process, the core function 51 updates the function catalog 61 to include an entry for function names of the functions in the script image 52. Thus, any of the script functions can be later invoked via execution of a function call identifying the name of the function. In this regard, when the virtual machine 53 executes a function call having the name of a function within the script image 52, the virtual machine 53 consults the function catalog 61 to locate the script's name within the catalog 61 and the associated pointer. The virtual machine 53 may then use the pointer to invoke the function being called.

If the destination address received along with the script image 52 from the host 110 identifies a node other than the node 21 coupled to the host 110, then the node 21 transmits the script image 52 to the identified node. In this regard, the stack 54 packetizes the script image 52 into at least one data packet, which has a header identifying the destination. For example, if the script image 52 is to be uploaded to node 23, then the destination address of the packet identifies the node 23. In such case, the packet is wirelessly transmitted by the communication device 77 of the node 21 to the node 23, which receives the packet and stores the packet in the packet buffer 65. The stack 54 depacketizes the packet and provides the payload data of the packet, which is at least a portion of the script image 52, to the virtual machine 53 of node 23. The virtual machine 53 of the node 23 stores the script image 52 in memory 55 and updates the function catalog 61 similar to the techniques described above for storing the script image 52 in the node 21. Thus, any function of the script image 52 can be invoked and executed by the virtual machine 53 of the node 23 in response to execution of a function call that includes the function's name.

In one exemplary embodiment, the function catalog 61 is updated based on a list of functions received from the host 110 that generated the script image 52. In this regard, the code translator 165 generates a list of functions that are in the script image 52 and pre-sorts the list in alphabetical order or some other logical order. In addition to transmitting the script image 52 to the node 23 that is to run the script image 52, the host core logic 152 also transmits the list of pre-sorted function names to such node 23. The node then replaces the function names currently in its function catalog 61 with the newly received list from host 110. The node also defines the pointers for the functional catalog 61 based on where each respective function is stored in the node's memory 55.

Note that the core function 51 for storing the script image 52 in memory 55 and updating the function catalog 61, as described above, stores the script image 52 in the language native to the virtual machine 53. Thus, no translation of the script image 52 is performed by the operations that write and read the script image 52 to and from memory 55. For example, when the virtual machine 53 is implemented as a PYTHON bytecode interpreter, as described above, the code defining the script image 52 is stored in memory 55 as a PYTHON data type. Thus, when the script image 52 is stored in memory 55, it can be executed by the virtual machine 53 without any further translation.

In one exemplary embodiment, the host 110 has an address within the network 20 such that the host 110 is essentially another node of the network 20. Indeed, as shown by FIG. 4, the host has a virtual machine 53 and core functions 51, like the other nodes 21-24 of the network 20. Thus, any node 21-24 of the network 20 can transmit a script image 52 to the host 110, which executes the script image 52 via its virtual machine 53. Accordingly, the resources of the host 110, such as the network interface 179, are available to the other nodes 21-24 of the network 24. In addition, although not shown in FIG. 4 for simplicity of illustration, the host 110, like any of the other nodes of the network 20, may comprise a function catalog 61, configuration parameters 63, and a packet buffer 65.

Figure 5:
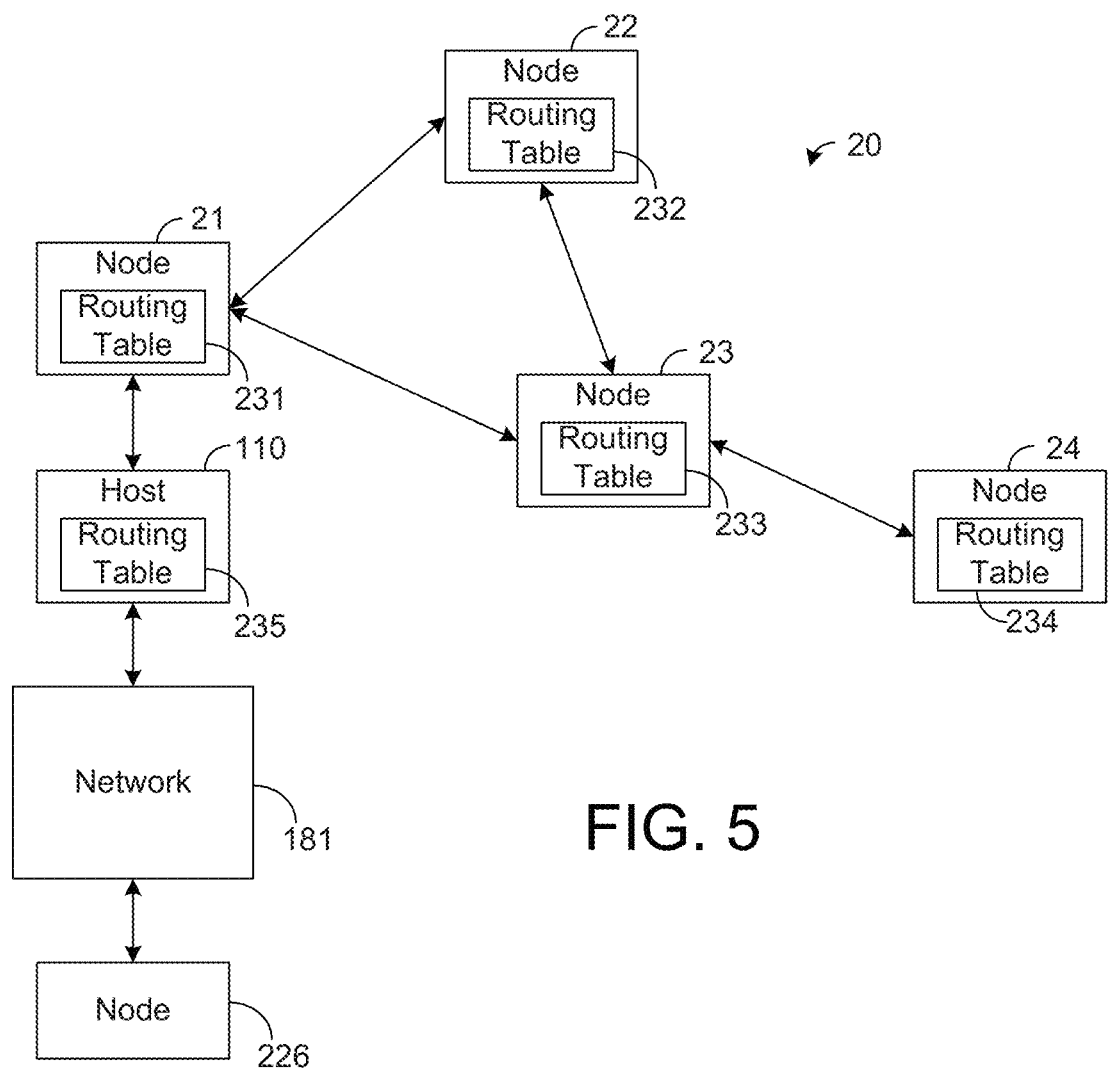
FIG. 5 is a block diagram illustrating an exemplary wireless network in accordance with the present disclosure.

For example, FIG. 5 depicts an embodiment in which a node 226 of the network 20 is located remotely from the other nodes 21-24 and host 110. As shown by FIG. 5, each node 21-24 and host 110 have routing tables 231-235, respectively. The routing tables 231-235 include information indicative of the routes that messages are to take in the network 20. Each node 21-24, including host 110, uses its respective routing table to determine how to define the header information of a packet depending on the packet's destination. The use of routing tables is generally well-known in network communications.

The node 226 is communicatively coupled to the host 110 via a network 181, such as the Internet. As described above, the host core logic 152 may communicate with the network 181 via the network interface 179 (FIG. 4). In one exemplary embodiment, the node 226 transmits messages to other nodes 21-24 through the network 181 and the host 110, and any of the nodes 21-24 may transmit messages to the node 226 through the host 110 (which as indicated above is one of the nodes of the network 20) and the network 181. Exemplary techniques for achieving such communication will be described in more detail below.

In this regard, to join the network 20, the node 226 is aware of the address of the host 110 for the network 181 (e.g., entered or selected by a user of the node 226). For example, if the network 181 is an Internet Protocol (IP) network, then the node 226 is aware of the IP address of the host 110. Note that the host's IP address is different than the host's address for the network 20. In this regard, to route a message to the host 110, the other nodes 21-24 use the host's address for the network 20. As described in more detail herein, in one exemplary embodiment, the address of a node of the network 20 is a portion of the node's media access control (MAC) address. Thus, the host 110 has an address for network 20 that is a portion of the host's MAC address, and the host 110 has an entirely different IP address used by the network 181 to route messages to the host 110. In other embodiments, other types of addresses may be used.

Using the IP address of host 110, the node 226 transmits a message through the network 181 for informing the host 110 of the node's presence. The message includes the address of the node 226 for the network 20 and the address of the node 226 for the network 181. As described above, in one embodiment, the address of the node 226 for the network 20 is a portion of the MAC address for the node 226.

Upon receiving the message 110, the host core logic 152 is configured to update the routing table 235 of the host 110 to include the address of the node 226 for the network 20. The other nodes 21-24 of the network 20 may discover the node 226 by broadcasting a route discovery message, as will be described in more detail hereafter. Other techniques for discovering nodes and updating routing tables are possible in other embodiments.

If any node 21-24 is to transmit a message to the node 226, such node 21-24 transmits a message that is routed to the host 110. The host core logic 152 is configured to encapsulate the message in one or more packets compatible with the network 181. For example, if the network 181 is the Internet as described above, then the core logic 152 is configured to encapsulate the message in one or more Transmit Control Protocol/Internet Protocol (TCP/IP) packets and to include the address of the node 226 for the network 181 in such packets. Note that the core logic 152 may encapsulate just the payload data of the packets of the network 20 defining the message, or the core logic 152 may encapsulate portions of the header information as well, if desired. The host control logic 110 then transmits the TCP/IP packet to the network 181, which routes this packet to the node 226. The node 226 depacketizes the TCP/IP packet to recover the original message.

Accordingly, packets can be transmitted by any of the nodes 21-24, 110 and host 110 to the node 226 utilizing the network 181 and resources of the host 110. Note that the use of the network 181 is transparent to the nodes 21-24. In this regard, when a node 21-24 desires to transmit a message to the remote node 226, the node 21-24 uses the address of the node 226 for the network 20. Thus, the transmitting node 21-24 transmits the message as if the node 226 is coupled directly to the host 110 without an intervening network 181. Further, it is unnecessary for the transmitting node 21-24 to be aware of the address of the node 226 for the network 181 or even to be aware of the presence of the network 181. Moreover, the host 110 handles the interfacing of the message with the network 181.

Note that the node 226 can transmit a message to any of the nodes 21-24, 110 in the reverse direction. In this regard, the node 226 defines a message to be transmitted and packetizes the message using a protocol compatible with the network 181. Further, the node 226 includes the address of the destination node. The node 226 transmits the data packet or packets through the network 181 to the host 110, and the host core logic 152 depacketizes such data packets to recover the message to be transmitted to the destination node 21-24. The host 110 then packetizes such message using a protocol compatible with the network 20 and transmits the data packet or packets formed by the host 110 to the node 21, which routes the message through the network 20 as appropriate. Thus, any of the nodes 21-24 can communicate in either direction with the remote node 226 using the host 110 and network 181 even though the presence of the network 181 is transparent to such nodes 21-24.

Figure 6:
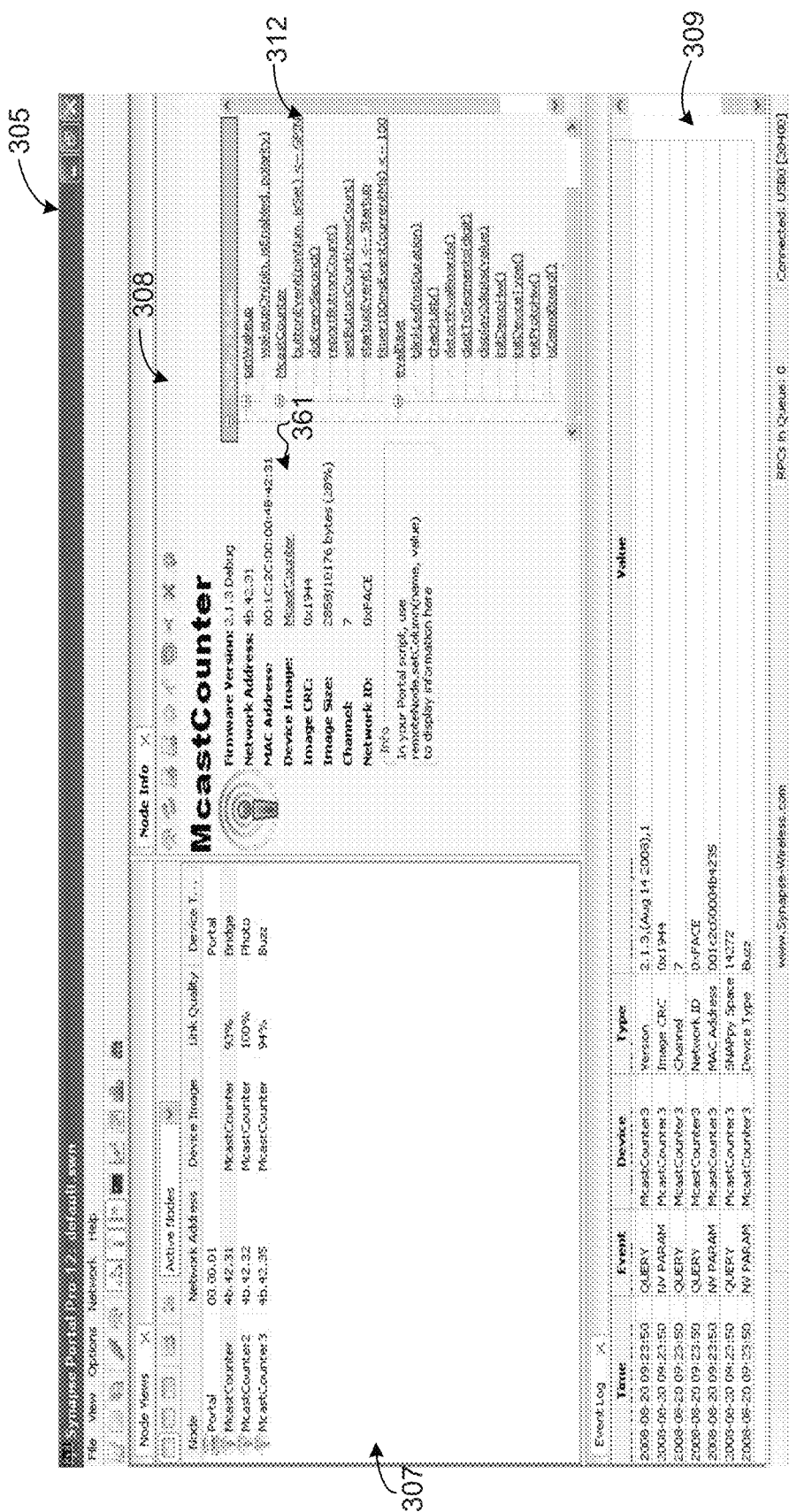
FIG. 6 is a diagram illustrating an exemplary graphical user interface (GUI) for displaying information about the configuration of a network, such as is depicted in FIG. 3.

In addition to enabling extension of the network 20 across another network 181, the host 110 can be used to monitor the network 20 and/or change the configuration and behavior of the network 20, as will be further described hereafter. As shown by FIG. 4, the host 110 comprises GUI logic 166 that is configured to display a GUI to a user. FIG. 6 depicts an exemplary GUI 305 displayed by the GUI logic 166. The exemplary GUI 305 of FIG. 6 has at least three windows 307-309. Other numbers of windows are possible in other examples.

Window 307 lists the nodes of the network 20. In this regard, for each node, the window 307 includes various information, such as the node's name, the node's address within network 20, the name of the script image 52, if any, stored at the node, the quality of the network communication link recently used by the node, and the device type of the node. Other types of information can be indicated in other examples.

Note that the node name can be defined by the user of the host 110 or otherwise. In one exemplary embodiment, a default name is randomly assigned to each node such that each node is assigned a unique name. If the user of the host 110 desires to change any of the default names, the user provides inputs, via the user input interface 176, for changing the default names. In response, the core logic 152 updates the node name as specified by the user. In one exemplary embodiment, the name of a given node is stored in the node. In such an embodiment, when the user changes a node name, the host core logic 152 transmits, to the node identified by the updated name, a remote procedure call for updating the node's name. Thus, the node name stored at the node is updated.

The device types can be defined and categorized in any useful manner. In one exemplary embodiment, a device type of "Portal" refers to a node, such as host 110, that can interface with a user in order to monitor and change the configuration and behavior of the network 20. A device type of "bridge" refers to a node, such as node 21, that has a direct link to a Portal node. A bridge node can be used by a Portal node to communicate with other nodes of the network 20. In one exemplary embodiment, each Portal node is coupled to a bridge node via a physical medium, such as a RS-232 connection. As an example, a Portal node may be implemented as a personal computer that is coupled to a bridge node in order to enable communication with other nodes of the network 20. In such an example, the personal computer has an address for the network 20 that can be used by the other nodes of the network 20 to communicate with the personal computer via the network 20. Other types of devices may be used to implement a Portal node in other embodiments.

In one exemplary embodiment, the host 110 receives the information displayed in the window 307 from the nodes of the network 20. In this regard, in order to discover the topology of the network, the host control logic 110 transmits a multicast message instructing each node 21-24 receiving the message to reply with information, referred to as "node status information," which includes at least the information displayed in window 307. This multicast message is received by the node 21, which then broadcasts the message to the other nodes 22-24 of the network 20. Upon receiving the message, each node 21-24 rebroadcasts the message, since it is a multicast message, and also replies with a unicast message for the host 110. In this regard, the node uses the source address (which identifies the host 110 in this example) from the multicast message for addressing the unicast message for the host 110. The unicast message includes, as payload data, the node status information requested by the multicast message, such as the name of the node, the address of the node, the name of the script image 52, if any, at the node, the most recent network link quality for the node, and the node's device type.

Using the user input interface 177 (e.g., a mouse), the user can select any of the nodes listed in the window 307, and the selected node is highlighted. For example, in FIG. 6, a node named "McastCounter" is selected by a user and, therefore, appears highlighted in the window 307. Information about the selected node is also displayed in the window 308. In the exemplary embodiment depicted by FIG. 6, the information displayed for the selected node includes the node name, the version of firmware running on the node, the node's address for network 20, the node's media access control (MAC) address, the node's device type, the name of the node's script image 52 (referred to as "device image" in the GUI 305), if any, a cyclical redundancy check (CRC) value for the script image 52, if any, the byte size of the script image 52, if any, the channel identifier for the channel on which the node is currently communicating, and the node's address within the network 20. Such displayed information within window 308 may be part of the node status information returned to the host 110 during network discovery. Note that a network discovery can be initiated at anytime by the user of the host 110 or otherwise (e.g., automatically) in order for the host 110 to refresh its network topology to account for nodes that may join or leave the network 20 from time-to-time. In other embodiments, other types of information may be displayed by window 308.

The CRC value within the node status information transmitted to the host 119 is the result of a calculation performed on the bytecode script image 52 at the node in which the script image 52 is stored. Thus, as will be described in more detail hereafter, by performing the same calculation on a version of the script image 52 and comparing the result of this calculation to the CRC value stored at the node, it is possible to determine whether the foregoing version matches the script image 52 stored at the node.

Also shown in window 308 for the selected node, "McastCounter," is a list 312 of function names for the core functions 51 as well as the functions defined by the script image 52 stored at the node. Similar to the other information displayed by window 308, the list 312 may be part of the node status information returned to the host 110 during network discovery. In one exemplary embodiment, the list 312 is based on the function catalog 61 stored at the selected node. In this regard, the multicast message transmitted by the host 110 during network discovery defines a remote procedure call that invokes at least one of the core functions 51. This core function 51 retrieves the node status information, including the function names stored in the function catalog 61, and transmits such retrieved information to the host 110. The node status information retrieved and transmitted by the core function 51 is then displayed in the window 308 of GUI 305 when the user selects the name of the node in the window 307.

Alternatively, the function catalog 61 may be stored at the host 110 such that retrieval of the function catalog 61 from the selected node is unnecessary. As described above, the function catalog 61 can be created by the host 110 when generating the bytecode script image 52 from a script source 161. The host core logic 152 may be configured to archive each function catalog 61 for the various nodes configured by the host 110. In such case, the function names displayed in window 308 can be retrieved from the host's memory 155 without being retrieved from the selected node. Other types of node status information may be similarly archived by the host 110 such that retrieval of such information from the nodes is unnecessary.

The window 309 displays information about various events that have occurred at the node selected in window 307. Each event is time stamped. The displayed events could include messages received from other network nodes and/or events detected by the script image 52 running at the selected node. Such events are logged at the selected node and transmitted to the host 110.

Figure 7:
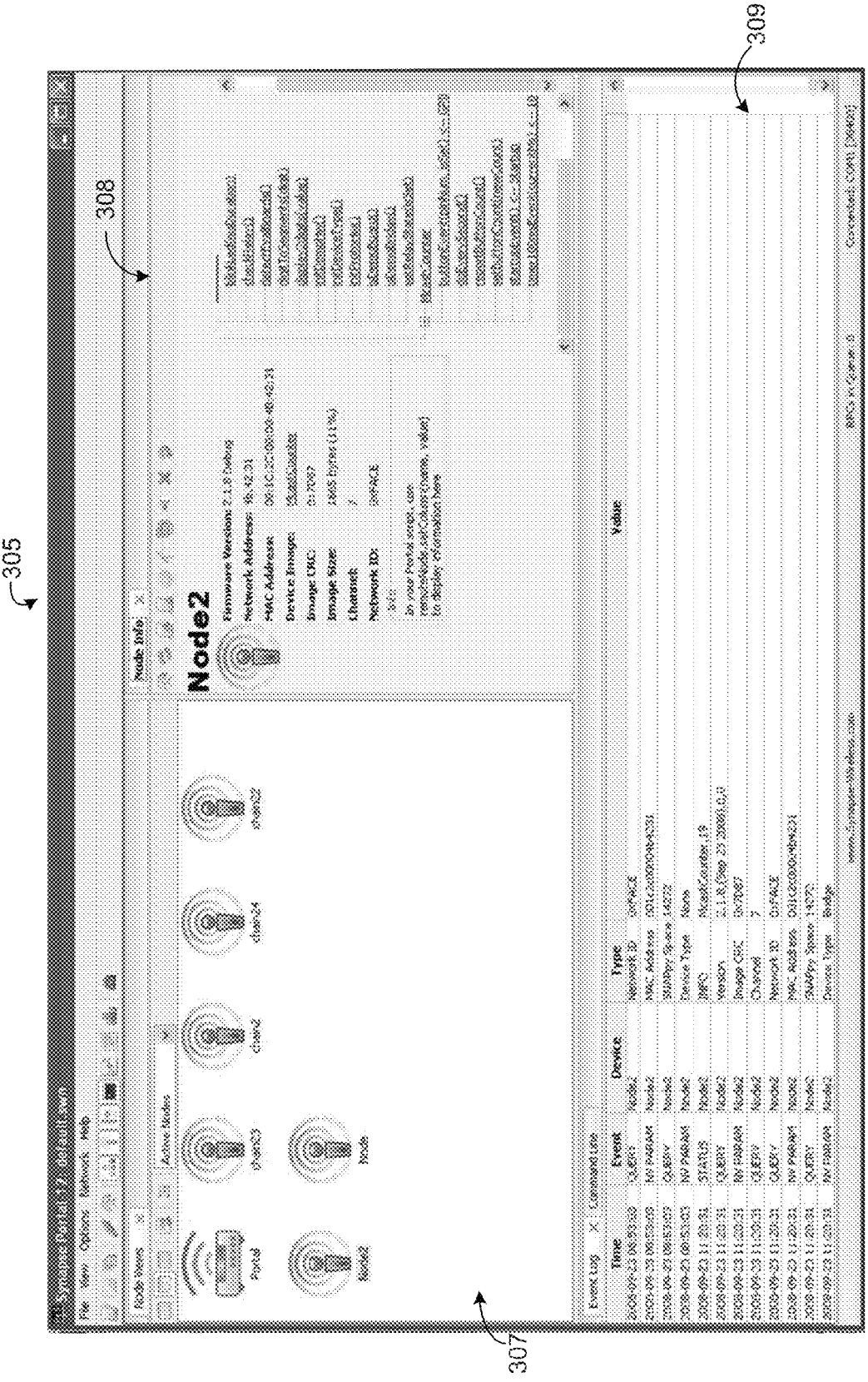
FIG. 7 is a diagram illustrating an exemplary GUI for displaying information about the configuration of a network, such as is depicted in FIG. 3.

Note that the GUI 305 may be displayed in various formats. For example, FIG. 7 shows an exemplary iconic GUI 305 in which the network nodes are represented by icons in window 307. Various other formats are possible in other examples.

In one exemplary embodiment, the function names in the window 312 are selectable hyperlinks. When the user selects the hyperlink for one of the function names via the user input interface 177, the host core logic 152 transmits a unicast message to the node identified by the information being displayed in the window 308. The unicast message comprises a remote procedure call for the selected function. Upon receiving the message, the function identified by the remote procedure call is invoked and executed. Thus, selecting the function name displayed by the host 110 results in execution, at the remote node (i.e., the node selected in window 307), of the selected function.

Figure 8:
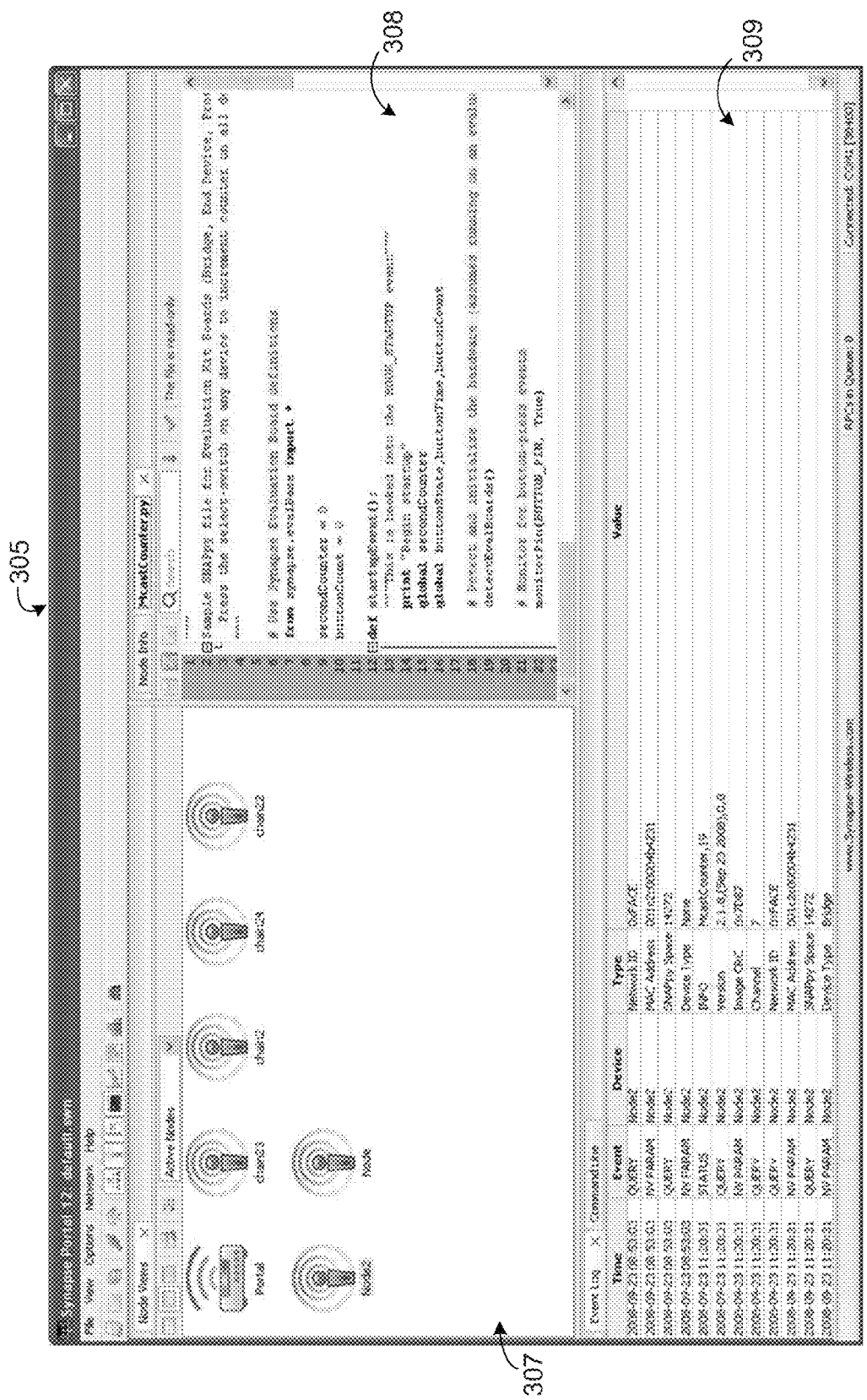
FIG. 8 is diagram illustrating an exemplary GUI for displaying source code for nodes of a network, such as is depicted by FIG. 3.

In addition, the script name displayed within window 308 also appears as a selectable hyperlink 361. When the hyperlink 361 is selected, the host core logic 152 displays the script source 161 of the identified script to the user, if such script source 161 is available to the host 110. In one exemplary embodiment, the script source 161 is displayed in a new window 308, as shown by FIG. 8. Note that there are a variety of techniques that may be used by the host core logic 152 to locate and display the script source 161 requested by the user via selection of the script name in the window 308 or otherwise.

In one exemplary embodiment, the script source 161 for each script image 52 generated by the host 110, as well as the generated script image 52, are retained in memory 155 and correlated with an address of the node to which the script image 52 is pushed by the host 110. Note that the memory 155 may include disks that can be transmitted from one computer system to another. The script source 161 is accessible to the host core logic 152 so that the script source 161 can be retrieved if it is later requested by a user of the host 110. However, before displaying the script source 161 in response to the request, the host core logic 152 firsts performs at least one test to determine whether the version of the script source 161 stored at the host 110 is obsolete. If so, the host core logic 152 warns the user.

For example, assume that the user requests the script image 52 stored at the node 23. As described above, the host 110 for each node retains the node's script image 52 generated at the host 110. In one exemplary embodiment, when the user requests the script image 52 stored at the node 23, the host core logic 152 is configured to retrieve the script image 52 for the node 23 stored at the host 110. The logic 152 is further configured to calculate a CRC value based on the retrieved script image 52 and to compare this calculated CRC value to the CRC value provided by the node 23 during network discovery or otherwise. Note that all nodes of the network 20 are configured to calculate CRC values according to the same algorithm. Thus, if the CRC value calculated by the host core logic 152 matches the CRC value from the node 23, then the core logic 152 determines that the script image 52 stored at the host 110 for the node 23 matches the script image 52 stored at the node 23. Thus, the logic 152 assumes that the corresponding script source 161 for the node 23 (i.e., the script source 161 from which the script image 52 at node 23 was originally generated) stored at the host 110 is not obsolete. However, if the two CRC values do not match, then the logic 152 assumes that the script image 52 stored at the host 110 for the node 23 does not match the script image 52 stored at the node 23. In such case, the core logic 152 determines that the corresponding script source 161 for the script image 52 stored at the host 110 is obsolete and warns the user.

In another embodiment, each time a script image 52 is pushed to a network node, the script source 161 from which the script image 52 was generated is also pushed to and stored at the node. Thus, the host 110 can request retrieval of a node's script source 161 directly from the node. Further, each time the node's script is updated, the source code is updated (e.g., replaced with the source code from which the uploaded script was generated). Thus, in such an embodiment, the script source 161 stored at the node should never be obsolete.

In any event, when a user requests a node's script source 161, the host core logic 152 is configured to locate and display the requested script source 161. The user may change the script source 161 in any desired manner. Once the script source 161 changes are complete, the user submits a request for the script source 161, as changed by the user, to be uploaded to a node. The user may specify that the modified script source 161 is to be uploaded to the same node identified within the window 308, or the user may specify that the modified script source 161 is to be uploaded to other nodes or a group of nodes. In response to the user's request, the core logic 152 invokes the source parser 164 and code translator 165 to convert the modified script source 161 into a tokenized script image 52 that can be executed by the nodes. The logic 162 then uploads the script image 52 to the identified node, and this node replaces its current script image 52 with the new script received from the host 110.

As a mere example, assume that the script source 161 for the script image 52 running on the node 23 is displayed to the user and that the user has modified this source code 161. Further assume that a script image 52 generated from the modified script source 161 is to replace the script image 52 currently running on the node 23. In one exemplary embodiment, the core logic 152 transmits, to the node 23, a unicast message defining a remote procedure call for one of the core functions 51 that causes the node to stop executing its script image 52. The core logic 152 then transmits, to the node 23, another unicast message defining a remote procedure call for one of the core functions 51 that erases the script image 52 currently stored at the node 23. The core logic 152 then transmits another unicast message to the node 23 defining a remote procedure call for one of the core functions 51 that writes data to the node's memory 55. The core logic 152 also transmits the new script image 52 to the node 23 via at least one unicast message such that the function 51 invoked by the foregoing remote procedure call writes the new script image 52 to the memory 55. The core logic 152 also transmits a unicast message to the node 23 defining a remote procedure call for one of the core functions 51 that causes the node 23 to reboot.

Thus, via execution of the core functions 51 called by the foregoing remote procedure calls, execution of the current script image 52 is stopped, the current script image 52 is erased from memory 55, the new script image 52 is written to memory 55, and the node 23 is rebooted. After the reboot, the new script image 52 runs such that the functionality of the node 23 is controlled by the new script image 52. In a similar manner, the script image 52 stored at any node of the network 20 can be updated as may be desired in order change the behavior of such node.

To illustrate the ease at which the behavior of the network 20 can be defined and modified, assume that a user wishes to monitor the sensor 125 (FIG. 3) in one part of a manufacturing facility and to turn on a light in another part of the facility based on the sensor 125. Assume that the user has a personal computer that he intends to use as the host 110. The user purchases the nodes 21-24 and sets them up in his facility as may be desired. For example, assume that the user couples node 21 to the host 110, and he couples node 24 to the sensor 125 and node 22 to the apparatus 126, as shown by FIG. 3. The user also downloads a suite of software including the core functions 51, virtual machine 53, stack 54, source parser 164, code translator 165, and core logic 152 to the host 110. Once the nodes 21-24, 110 are powered up, they are able to communicate as a mesh network 20. In this regard, the nodes 21-24, 110 automatically communicate with one another to learn of each other's presence on the network 20 and to define routing tables for routing unicast messages through the network 20.

In addition, the core logic 152 of the host 110 discovers the topology of the network 20 by broadcasting a multicast message that is rebroadcast by the nodes 21-24. Each node 21-24 replies with a unicast message including various node status information, as described above. Thus, the core logic 152 learns the topology of the network 20 and displays a list of the nodes 21-24 in a GUI 305.

Within the window 307, the user selects the name of the node 24 that is coupled to the sensor 125. In response to such selection, the node status information for this node 24 is displayed in window 308. Since a script image 52 has yet to be defined for this node 24, only the names of the core functions 51 are displayed. The user then provides an input indicating that he would like to define a new script. In response, a window is created in which the user can write script source 161 to define the new script. Upon completion, the source parser 164 and code translator 165 convert the script source 161 to a tokenized script image 52, which can be executed on the node 24. The script image 52 is assigned the same name as the script source 161 and is transmitted through the network 20 to the node 24. In addition, the code translator 165 generates a list of function names that are within the script image 52 and pre-sorts the function names in alphabetical order or some other type of order. This list of function names is also transmitted to the node 24.

The node 24 stores the script image 52 in memory 55, and the function catalog 61 of the node 24 is updated to include the list of function names received from the host 110 and the associated pointers. The node 24 is then rebooted. Upon reboot, the script image 52 begins running and, therefore, in the instant example begins monitoring the sensor 125. Note that the communication of the script image 52 through the network 20 is transparent to the user. In this regard, the user simply identifies which node 24 is to receive the script image 52, and the script image 52 is automatically transmitted as requested.

Similarly, the user may define and push, to the node 126, a script image 52 for controlling the apparatus 126. For example, the script image 52 may define a function, called "Light_On," that is called by the script image 52 of the node 24 when such script image 52 senses activation of the switch 125. In the instant example, the called function activates the apparatus 126 such that it begins emitting light. Thus, when the script image 52 of the node 24 detects activation of the sensor 125, the script image 52 transmits to node 22 a remote procedure call that calls the function "Light_On." Upon execution of the remote procedure call, the virtual machine 53 of the node 22 checks the function catalog 61 of such node 22 for the function name "Light_On." Upon locating such name, the virtual machine 53 invokes the named function, which causes the apparatus 126 to emit light. At any time, the scripts 52 at either of the nodes 22 and 24 may be updated to implement new functionality according to techniques described above.

Note that the use of remote procedure calls to invoke new functions facilitates the dynamic configurability of the network 20. In this regard, the format for a remote procedure call includes as payload data the name of a procedure to be called. The remote procedure call also includes overhead information that identifies the message as being a remote procedure call. Thus, each remote procedure call is of the same message type in which the data carried by the message can be controlled in order to reference a particular function or script. Therefore, when a new function is defined, it is unnecessary to create a new message type in order to invoke the function. In this regard, to invoke the function, a remote procedure call, which is of a message type known by all of the network nodes, can be generated, and the name of the new function can be inserted into the data portion of the message. Each node, upon identifying the message as a remote procedure call based on the message's overhead, is configured to read this data portion and then compare the read data to the function list defined by the function catalog 61 in an effort to locate the address of the function to be executed in response to the remote procedure call. Accordingly, a remote procedure call can be used to invoke a newly defined function, and it is unnecessary for the user who writes a new function to define a new message type or even be aware of the communication protocols used by the network 20.

It should be noted that there are various techniques that may be employed to enable the network 20 to operate more efficiently and otherwise better. For example, in one exemplary embodiment, the network addresses are predefined such that each node has a network address upon joining the network 20. In this regard, in a conventional network, a node is often assigned a network address by a coordinator node. In this regard, a node that is attempting to join a network transmits a message indicating the node's desire to join the network. A coordinator then replies with a network address that is unique within the network. This network address is thereafter used to identify the node within the network 20.

In the network 20, each node defines its network address to be at least a portion of its MAC address. For example, in one embodiment, each node uses as its network address the least significant three bytes of its MAC address. In other examples, other portions of the MAC address or other types of predefined addresses may be used. Thus, each node is aware of its network address without having to first contact a coordinator to be assigned such an address. Therefore, the node is able to join the network 20 and begin communicating through the network 20 quicker than would otherwise be possible if the node had to wait on a coordinator to assign it an address within the network 20.

In one exemplary embodiment, the communication device 77 (FIG. 2) of each node 21-24 is configured to provide a signal, referred to hereafter as "energy level signal," indicative of the amount of energy detected for the channel being used by the node for network communication. Before wirelessly transmitting a message via the same channel, the node's stack 54 analyzes the energy level signal. If the energy level signal is above a predefined threshold, the stack 54 determines that there is traffic being communicated through the network 20 via the channel. Thus, the stack 54 waits before sending the message in an effort to avoid a data collision with the traffic. In this regard, the stack 54 waits a predefined time interval and then again checks the energy level signal. If it is still above the threshold, the stack 54 continues waiting. The stack 54 continues waiting in such manner until the stack 54 determines that the energy level signal is below the threshold. When this occurs, the stack 54 proceeds with transmitting the message by sending the message to the communication device 77 for wireless transmission. Accordingly, data collisions within the network 20 are reduced.

In one exemplary embodiment, the energy level signal is checked by the stack 54 immediately after transmission of a message by the communication device 77. If the energy level is above a predefined threshold, then the stack 54 assumes that the message collided with other traffic or noise on the channel at the time of transmission. Thus, it is unlikely that the message was successfully received by another node of the network 20. In such a situation, the stack 54 retransmits the message via the communication device 77.

If, however, the energy level signal is below the predefined threshold immediately after transmission of a message through the channel by the communication device 77, then the stack 54 assumes that no collision occurred with other traffic or noise. Thus, the stack 54 does not attempt to retransmit the message unless it receives another indication that the message was not successfully received (e.g., if the stack 54 fails to receive an acknowledgement for the message after a predefined time period from transmission).

As indicated above, multicast messages are rebroadcast by nodes of the network 20 in an attempt to inform other nodes of the multicast message. However, in one exemplary embodiment, a node determines whether to rebroadcast a multicast message based on the energy level signal provided by the communication device 77. In this regard, the stack 54 buffers values of the energy level signal so that the stack 54 can analyze the buffered values to determine the recent state of the energy level signal. When a multicast message is received by the communication device 77, the stack 54 analyzes the buffered energy level signal values to determine a value of the energy level signal when the multicast message was being received by the communication device 77. Such value indicates the strength of the multicast message at the time of reception. In this regard, a higher energy level signal value indicates a higher strength or power level for the message.

Moreover, a high power level for the message suggests that the node transmitting the message is close to the receiving node. For purposes of illustration, assume that the node 21 is the transmitting node, and assume that the node 22 is the receiving node. If a message transmitted from the node 21 to the node 22 is associated with a high energy level signal value (i.e., the energy level signal provided by the communication device 77 of node 22 is high at the time of reception by node 22), it is likely that any node that is within the transmission range of node 22 is also within the transmission range of node 21, assuming that the transmit power of node 21 is similar to that of node 22. Thus, the benefit of having the node 22 rebroadcast the multicast message in such a case is relatively low.

In one exemplary embodiment, the stack 54 of the receiving node is configured to compare a predefined threshold to the energy level value associated with a received multicast message (e.g., a value of the energy level signal while the multicast message is being received by the communication device 77). If the energy level value is below the threshold, then the stack 54 is configured to rebroadcast the multicast message. However, if the energy level value is above the threshold, then the stack 54 refrains from rebroadcasting the message. Accordingly, the total number of times that the nodes of the network 20 rebroadcast a multicast message can be reduced without significantly limiting the range of the multicast message.

Various other techniques for improving communication within the network are possible.

Note that sleeping nodes can cause problems and/or inefficiencies in network communications. For example, as described herein, many messages hop through a network from node-to-node until arriving at their respective destinations. Moreover, the routing tables 231-235 in the network nodes indicate data paths over which messages may travel. However, sleeping nodes may disrupt such data paths. As a mere example, consider a situation in which a message from node 21 is to hop through node 23 in order to arrive at node 24. If node 23 transitions to a sleep state, then the message from node 21 cannot reach node 24 via the aforementioned data path while the node 23 is sleeping.

In such a situation, the node 21 may attempt to send the message unaware that the node 23 is in a sleep state. Since the node 23 is sleeping, it does not receive the message nor send an acknowledgement. Accordingly, the node 21 may attempt several retransmissions. After several attempted retransmissions, the node 21 may stop its efforts to communicate through node 23. In such a situation, the node 21 may try to discover another route to reach the node 24 by broadcasting a message to other nodes that may be able to communicate with the node 24 via a different route. If another route can be located, then the node 21 may attempt to transmit the message to the node via the other route. However, the time required to find the other route and the time utilized to attempt communication with the node 23 before realizing that this node 23 is not presently available for routing increase the delay in communicating the message to the node 24. In addition, the unsuccessful attempts to transmit to the node 23 and the messages related to the discovery of the new route increase the traffic on the network 20 and possibly increase data collisions thereby decreasing the overall efficiency of the network 20.

Due to the problems and inefficiencies caused by sleeping nodes in network communications, many conventional networks, particularly mesh networks in which each node controls the transmission times of its own outgoing messages, are configured such that nodes are not allowed to transition to sleep states. Thus, the network is generally kept up and running so that any node at any time can successfully transmit messages through the network. However, preventing nodes from transitioning to sleep states undesirably increases the power requirements of the nodes.

In one exemplary embodiment, at least some of the nodes 21-24, 110 of the network 20 are allowed to transition to sleep states such that the sleeping nodes are unable to communicate with other nodes while in the sleep state. For example, a node 21-24 may power down its communication device 77 and/or other components that enable network communication while in a sleep state thereby conserving electrical power. U.S. patent application Ser. No. 12/253,086, entitled "Systems and Methods for Reducing Power Consumption in Communication Networks," and filed on Oct. 16, 2008, which is incorporated herein by reference, describes exemplary techniques for controlling sleep states of network nodes. In one exemplary embodiment, the data paths for the network 20 are based on the sleeping characteristics of the nodes 21-24, 110 in an effort to reduce inefficiencies and problems caused by sleeping nodes in the network 20.

In this regard, as described above and shown by FIG. 5, the nodes 21-24 have routing tables 231-235 that indicate data paths for messages to be communicated through the network 20. To better illustrate aspects of packet routing, exemplary techniques for defining the routing tables 231-235 will be described in more detail below. However, it should be emphasized that various other techniques may be used to define the routing tables 231-235.

Referring to FIG. 5, assume that the node 22 has already discovered a data path to node 24. In this regard, assume that the routing table 232 indicates that a message destined for the node 24 is to hop through the node 23. In this regard, there is an entry for each route defined by the table 232. The entry for the data path to the node 24 includes the address of node 24 as the destination and the address of the node 23 as the next hop in order to reach such destination. Note that there is no need for the table 232 to include the addresses of other hops, if any, along an indicated data path.

If the node 22 is to transmit a message to the node 24, the node 22 transmits a message via at least one data packet. The data packet has a header, which includes a destination address that identifies node 24 and a hop address that identifies node 23. In addition, the routing table 233 of node 23 indicates that a message destined for the node 24 may be communicated directly to the node 24. Thus, when the node 23 receives the foregoing data packet destined for the node 24, the node 23 forwards the packet to the node 24 by changing the hop address to identify node 24 and then retransmitting the packet. In such an example, the node 22 is the source node, the node 24 is the destination node, and the node 23 is a routing node, since a packet from the source to the destination is routed through the node 23. Note that in other examples, there may be more than one routing node.

Now assume that the node 21 has yet to discover a route to the node 24 but desires to communicate with this node 24. Also assume that the node 21 is not within range of the node 24. Therefore, direct communication between nodes 21 and 24 is not possible. To discover a route to the node 24, the node 21 broadcasts a message, referred to hereafter as a "route discovery message." In one exemplary embodiment, the route discovery message is rebroadcast like a multicast message and includes the network address of the node 21 that originally broadcast the message. The route discovery message also includes the network address of the node 24, referred to as the "destination node," for which a route is being sought.

When a node, referred to as the "receiving node," receives a route discovery message, the receiving node determines whether it is the destination node. If it is not the destination node, then the receiving node rebroadcasts the message. However, unlike many other multicast messages, the receiving node includes its own identifier in the rebroadcast message. Thus, the route discovery message, when it is ultimately received at the destination node, will include the network address of the node 21 that originally broadcast the message and the addresses of all of the hops from such node 21 to the destination node 24. Thus, the message indicates a complete route from the node 21 to the destination node 24. The hop addresses included in the route discovery message are used to enable duplicate filtering of the route discovery message. In this regard, if any of the hop nodes identified in the message receives the message from another node of the network 20, the hop node, in response to its own identifier in the message, refrains from rebroadcasting the message. Thus, the destination node 24 is prevented from receiving multiple "pings" of the same route discovery message from the same hop node.

The node receiving the route discovery message may be configured to update its own routing table based on such message. In this regard, in one exemplary embodiment, if the routing table of the receiving node does not indicate a route for the node 21 that originally transmitted the route discovery message, then the receiving node updates its routing table to include an entry for the original transmitting node 21. The receiving node also updates such entry to include the address of the next hop for the route to the original transmitting node 21 based on the addresses in the route discovery message. In this regard, the address of the next hop included in the routing table entry is the address from which the route discovery message was directly received (i.e., the address of the last hop for the route discovery message). Thereafter, the entry may be later used to transmit a message to the node 21 that originally transmitted the route discovery message.

If the node receiving the route discovery message determines that it is the destination node identified in the message, then the node responds to the route discovery message with a unicast message to the node 21 that originally broadcast the route discovery message. In this regard, the unicast message identifies the original transmitting node 21 (i.e., the source of the route discovery message) and the address of the next hop, which is the same node from which the route discovery message was directly received by the destination node 24. Therefore, the message is routed through the path defined by the addresses in the received route discovery message to the node 21 that originally broadcast the route discovery message. This node 21 then updates its routing table 231 to appropriately indicate the route to the destination node 24. In this regard, the node 21 creates an entry in its routing table 231 and includes the address of the destination node 24. The node 21 also includes the address of the next hop, which is the node from which the unicast message was directly received (i.e., the address of the last hop node for the unicast message prior to being received by the node 21). Note that each unicast message communicated in the network 20 preferably includes the address of the transmitting node (i.e., the node from which the message is being transmitted) and, therefore, the address of message's last hop.

In the instant example, assume that the routing table 231 of the node 21 indicates that messages destined for the node 24 are to be routed through the node 23, which is configured to route such messages directly to the node 24. Thus, if a message is to be transmitted to the node 24, the node 21, based on the routing table 231, transmits at least one packet that identifies the node 24 as the destination and the node 23 as the next hop. Upon receiving the packet, the node 23 forwards the packet to the node 24 based on its routing table 233 by changing the next hop address to that of the node 24.

In one exemplary embodiment, the nodes 21-24, 110 are categorized into at least two categories, routing nodes and routing-disabled nodes. A routing node is a node that is enabled to function as a hop for unicast messages transmitted from other source nodes to other destination nodes. A routing-disabled node is a node that is disabled from functioning as a hop for unicast messages transmitted from other source nodes to other destination nodes. In other words, a routing-disabled node is prevented from routing unicast messages through the network 20. Accordingly, a routing-disabled node can transmit unicast messages that are then routed through the network 20 or, in particular, can function as a source for unicast messages. Also, a routing-disabled node can receive unicast messages that have been routed through the network 20 or, in particular, can function as a destination. However, a routing-disabled node is prevented from forming part of a route for which the routing-disabled node is not the source or the destination in a unicast message.

Therefore, the routing tables 231-235 are defined such that routing nodes may be indicated as next hops for any unicast message. However, the routing tables 231-235 are defined such that routing-disabled nodes are not indicated as the next hop for any unicast message, unless a routing-disabled node is the destination for the unicast message.

In one exemplary embodiment, the nodes 21-24, 110 are categorized as routing or routing-disabled based on the anticipated sleeping characteristics of such nodes 21-24. For example, nodes that are not to transition into sleep states during operation can be categorized as routing nodes, and nodes that are to transition into sleep states during operation can be categorized as routing-disabled nodes. Moreover, since routing-disabled nodes are not used for hops of unicast messages destined for other nodes, it is less likely that the transition of a routing-disabled node to a sleep state will affect the performance of the network 20 for the other nodes. In this regard, while the routing-disabled node is in a sleep state, the other nodes may communicate with one another via the network 20 without having to discover new routes or update their routing tables since the transition of the routing-disabled node to a sleep state does not affect the data routes between such other nodes.

Note that, if desired, some nodes that are to transition to a sleep state may be categorized as routing nodes. For example, nodes that rarely (relative to other nodes) transition to a sleep state may be categorized as routing nodes while nodes that more frequently transition to sleep states may be categorized as routing-disabled. Since nodes that transition to sleep states more frequently are prevented from functioning as routing nodes, the overall communication efficiency of the network 20 may be enhanced. Further, it may be desirable to categorize a node, referred to as a "sleep-enabled node," that transitions to a sleep state as a routing node based on its geographic location. For example, depending on the locations of the nodes with respect to one another, a particular node may be only reachable through a sleep-enabled node. In such a case, it may be desirable to categorize the sleep-enabled node as a routing node so that communication with the particular node is enabled at least during the times that the sleep-enabled node is awake. In various other examples, it may be desirable for routing nodes to be allowed to transition to sleep states.

In addition, routing-disabled nodes are generally allowed to rebroadcast multicast messages except as may otherwise be described herein. In this regard, as previously described above, specific data paths are not defined for multicast messages. Generally, each node that receives a multicast message rebroadcasts the message although, as described herein, techniques may be employed to ensure that the life of a multicast message is limited. Moreover, since there are not predefined paths for multicast messages, the transition of a routing-disabled node to a sleep state should not have a significant effect to the overall communication efficiency of the network 20 for multicast messages.

Various techniques for preventing routing-disabled nodes from functioning as hops for unicast messages between other nodes, as described above, are possible. In one exemplary embodiment, each routing-disabled node is prevented from rebroadcasting route discovery messages, although a routing-disabled node may reply to a route discovery message if it is the destination for such message. Thus, if routes are discovered via the broadcast of route discovery messages, as described above, then a routing-disabled node should not be identified as a hop in any route discovery message received by another node. Accordingly, the routing tables 231-235 are defined such that the routes indicated by such tables do not include a routing-disabled node as a hop for messages unless the routing-disabled node is the destination. In other words, the routing tables 231-235 are defined such that a routing-disabled node is indicated as the next hop only for messages destined for such routing-disabled node. Therefore, if the routing-disabled node transitions to a sleep state, such a transition should not disrupt the data paths for message destined for other nodes.

Note that there are various techniques that may be used to categorize nodes as routing or routing-disabled. In one exemplary embodiment, the configuration parameters 63 (FIG. 2) stored in a node includes an indicator, referred to hereafter as the "routing indicator," indicating whether the node is a routing node or a routing-disabled node. As an example, the routing indicator may be a one bit value in which a logical low state indicates that the node is a routing node and a logical high state indicates that the node is a routing-disabled node. Such an indicator may be user-controlled. For example, the indicator may be set to a default value (e.g., indicating that the node is a routing node), but this default value may be changed by a user. In at least one exemplary embodiment described herein, one of the core functions 51 is for changing the configuration parameters 63. Thus, a user may change the routing indicator by initiating a remote procedure call for calling such core function 51. However, other techniques for setting and/or changing the routing indicator are possible.

Figure 9:
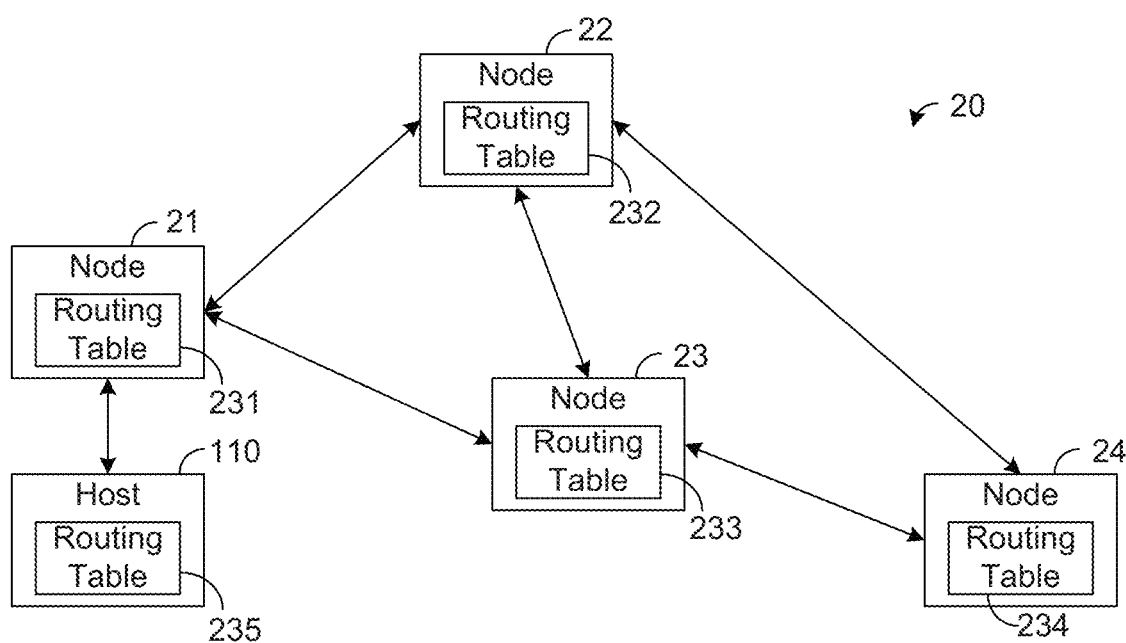
FIG. 9 is a block diagram illustrating an exemplary wireless network in accordance with the present disclosure.

An exemplary use and operation of the network 20 will now be described with reference to FIG. 9.

In this regard, assume that the nodes 22 and 23 are both in range of the node 24 such that they can each communicate directly with the node 24. Further assume that the node 21 broadcasts a route discovery message for discovering a route to the node 24. In addition, the routing table 232 of the node 22 indicates a route to the node 24 in which the node 24 is identified as the next hop, and the routing table 233 of the node 23 similarly indicates a route of the node 24 in which the node 24 is identified as the next hop. Also assume that the routing indicator of the node 22 is set to indicate that the node 22 is a routing-disabled node and the routing indicator of the node 23 is set to indicate that the node 23 is a routing node.

Figure 10:
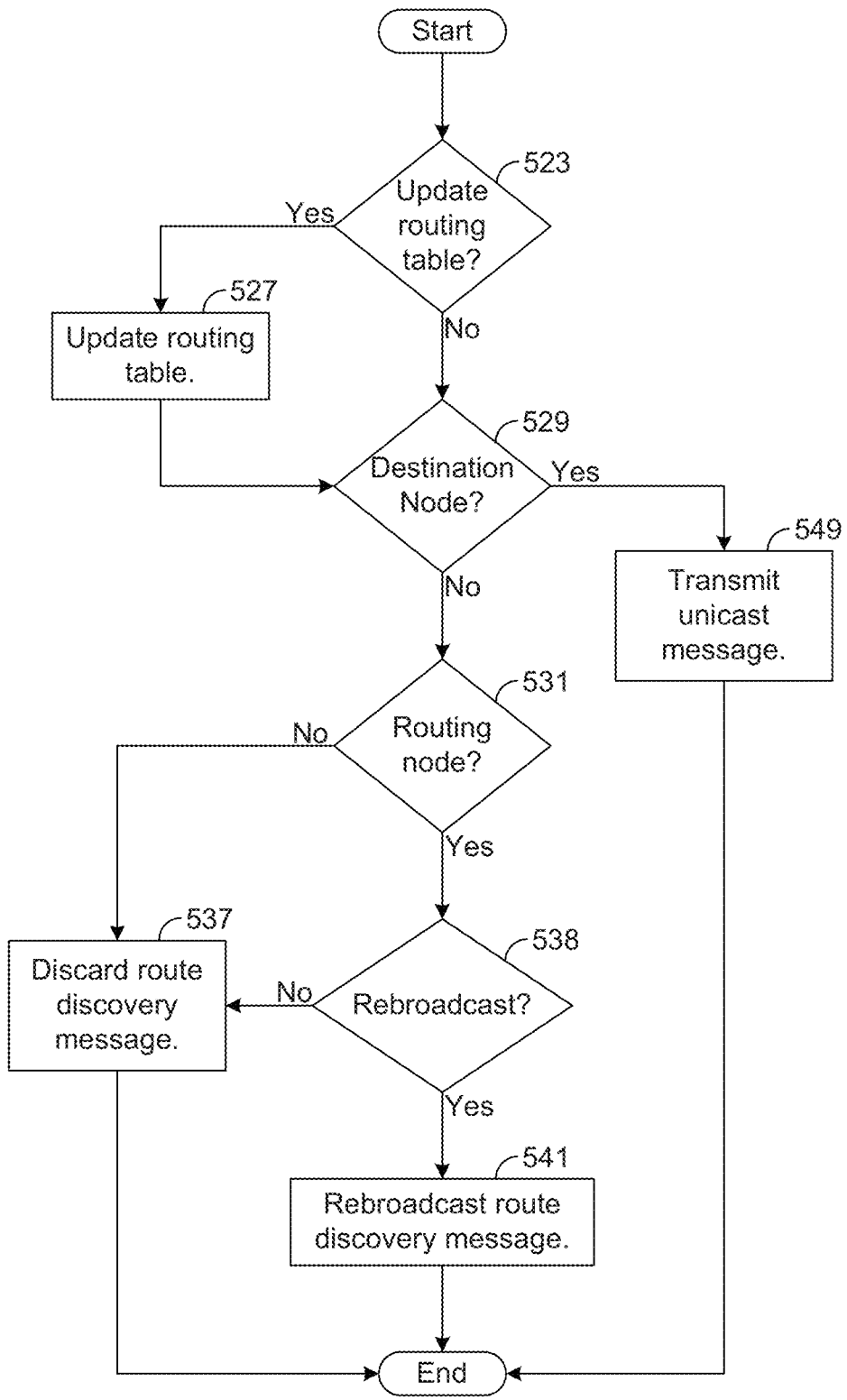
FIG. 10 is a flow chart illustrating an exemplary method for responding to a route discovery message.

When the node 22 receives the route discovery message, the core logic 80 of the node 22 checks the routing table 232 to determine whether it should be updated, as shown by block 523 of FIG. 10. For example, if the routing table 232 does not indicate a route for the node 21 that originally broadcast the route discovery message, then the core logic 80 determines that the table 232 should be updated to indicate such a route. In such an example, the core logic 80 of the node 22 updates the routing table 232, as shown by block 527, so that future messages can be communicated to the node 21 without having to implement a route discovery process.

The core logic 80 also determines whether the node 22 is the destination for the route discovery message and, therefore, whether to reply to the route discovery message, as shown by block 529 of FIG. 10. In this regard, the core logic 80 compares the destination address (i.e., the address of the node being sought) of the message to the address of the receiving node 22. If the node 22 is the destination for the message, then the core logic 80 initiates a reply. Otherwise, the core logic 80 decides not to reply. In the instant example, the node 22 is not identified by the destination address of the route discovery message, and the core logic 80, therefore, makes a "no" determination in block 529.

The core logic 80 of the node 22 also checks the routing indicator stored at the node 22 to determine whether the node 22 is a routing node, as shown by block 531 of FIG. 10. Such indicator indicates that the node 22 is a routing-disabled node. Thus, the core logic 80 discards the route discovery message without replying or rebroadcasting such message, as shown by block 537.

When the node 23 receives the same route discovery message broadcast by the node 21, the core logic 80 of the node 23 determines whether to update its routing table 233 and whether to reply, as described above for the node 22. In the instant example, the node 23 is not the destination for the route discovery message and, therefore, does not reply. The core logic 80 of the node 23 also checks the routing indicator stored at the node 23 to determine whether the node 23 is a routing node, as shown by block 531 of FIG. 10. Such indicator indicates that the node 23 is a routing node. Thus, the core logic 80 determines whether to rebroadcast the message, as shown by block 538 of FIG. 10. In this regard, the core logic 80 checks the hop addresses included in the message. If the node 23 is identified by one such hop address, the core logic 80 determines in block 538 that the message is not to be rebroadcast. In the instant example, assume that the node 23 is not identified by the route discovery message. Thus, the core logic 80 initiates a rebroadcast of the route discovery message such that the node 23 rebroadcasts the route discovery message, as shown by block 541. Before rebroadcasting the message, the core logic 80 inserts the address of the node 23 as a hop address in the message. Therefore, if the node 23 later receives a rebroadcast of this same message, the node 23 will not attempt to rebroadcast the message again.

The route discovery message transmitted by the node 23 is received by the node 24. The core logic 80 of the node 24 determines whether to update its routing table 234 and whether to reply, as described above for the node 22. In the instant case, the receiving node 24 is identified by the destination address of the route discovery message rebroadcast by and received from the node 23. Thus, the core logic 80 of the node 24 replies to the route discovery message, as shown by block 549. In this regard, the node 24 replies with a unicast message that is routed through the network 20 in reverse to the path used by the route discovery message to reach the node 24. Based on the reply, the node 21 updates its routing table 231 such that, when transmitting a message for the destination node 24, the address of the node 23 is included in such message as the next hop address. Accordingly, such message is routed from the node 21 through the node 23 to the node 24.

As illustrated in the above example, the routing-disabled node 22 is prevented from functioning as a hop for messages communicated from the node 21 to the node 24. Such an effect is realized by preventing the node 22 from participating in the route discovery process initiated by the node 21 based on the routing indicator stored at the node 22. The node 22 is similarly disabled from participating in other route discovery processes initiated by the node 21 or other nodes of the network 20 unless the node 22 is the destination. In other examples, other techniques for disabling the node 22 from routing messages are possible.

Network identifiers are preferably used to distinguish messages communicated by the network 20 from other messages communicated by foreign networks within range of the nodes 21-24. In this regard, the network 20 is assigned a unique network identifier that distinguishes the network 20 from other networks. Each node 21-24, 110 of the network 20 is aware of and stores the network identifier. For example, the network identifier may be one of the configuration parameters 63 (FIG. 2) stored in the node. Further, for each message communicated within the network 20, the transmitting node includes the network identifier of the network 20. In this regard, each packet transmitted by the network 20 has a header, which includes a network identifier field at the same bit positions for each message. For example, the first byte of each header may be the message's network identifier. For each message received by the network communication device 77 of a receiving node of the network 20, the core logic 80 of the receiving node compares the network identifier of the message to the stored network identifier for the network 20. If the two identifiers match, then the receiving node receives and processes the message. However, if a matching identifier is not found in the message, then core logic 80 determines that the message is from a foreign network and discards the message without further processing it. Thus, each node responds to messages received by its network communication device 77 from other nodes of the network 20, and each node discards messages received by its network communication device 77 from other networks.

In one exemplary embodiment, a default network identifier is used for the network 20. However, a user may change this default network identifier to a customized network identifier. For example, one of the core functions 51 in each network node 21-24, 110 may be used to change the network identifier used by the node. Thus, a user of the host 110 or other node may submit a remote procedure call that includes a new network identifier for the network 20. Further, the user may transmit such a remote procedure call to each node 21-24 of the network 20 in order to change the network identifier used by each such node 21-24. In response to such a procedure call, the virtual machine 53 of the receiving node calls and executes the core function 51 correlated with the remote procedure call. Execution of such core function 51 overwrites the current network identifier stored by the node with the new network identifier included in the remote procedure call. Thereafter, the node uses the new network identifier when transmitting and receiving messages via the network communication device 77.

Note that a similar procedure may be used to split a network 20 into two different networks. In this regard, a user may submit the foregoing remote procedure call to only some of the nodes 21-24 of the network 20. Such nodes begin using the new network identifier while the other nodes continue using the old network identifier. Accordingly, the network 20 is effectively split into two smaller networks.

A problem may occur when a node 21-24, 110 is updated with an incorrect network identifier. For example, when a user attempts to change the network identifier of a node to a new network identifier, a remote procedure call may be used as described above. However, if the user mistypes or otherwise incorrectly defines the new network identifier, then the node may change the stored network identifier to an incorrect identifier. In another example, transmission errors or data processing errors may result in the node receiving and storing an incorrect network identifier. After a node begins using an incorrect network identifier, communication with the node may be difficult or, some cases, impossible.

For example, consider a case in which a user attempts to change the network identifier of network 20 to a new address. Assume that the nodes 21-23 are correctly updated with the new network identifier but that node 24 is updated with an incorrect identifier. In such a case, the messages communicated by the nodes 21-23 have one network identifier, referred to hereafter as the "correct network identifier," and the messages transmitted by the node 24 have another network identifier, referred to hereafter as the "incorrect network identifier." In such an example, the nodes 21-23 do not recognize the messages transmitted by the node 24, and the node 24 does not recognize the messages transmitted by the nodes 21-23. In this regard, the correct network identifier of the messages received by the node 24 from the nodes 21-23 does not match the incorrect network identifier being used by the node 24, and the node 24, therefore, discards such messages. In addition, the incorrect network identifier of the messages received by the nodes 21-23 from the node 24 does not match the correct network identifier being used by the nodes 21-23, and the nodes 21-23, therefore, discard such messages. Thus, the node 24 can no longer communicate with the other nodes 21-23, and the node 24 appears to be "lost" from the network 20.

In one exemplary embodiment, each node stores and uses at least two network identifiers such that the network 20 is identified by at least two valid network identifiers. If a received message includes either of the network identifiers, then the receiving node processes and responds to the message. Therefore, either of the network identifiers can be used to route a message through the network 20. If one of the network identifiers for a node is incorrectly changed, then the node can still be reached via the other network identifier.

In one exemplary embodiment, one network identifier, referred to as the "primary network identifier," is primarily used by the network nodes 21-24, 110. Another network identifier, referred to as the "secondary network identifier," is used only for certain message types or in certain situations. For example, consider a case in which a user attempts to update the primary network identifier for each of the nodes 21-24 but mistakenly updates the primary network identifier for the node 24. In such a situation, the nodes 21-23 begin communicating using the correct primary identifier, and the node 24 begins communicating using an incorrect primary identifier. Thus, communication with the node 24 appears to be lost since the node 24 discards the messages from the nodes 21-23 and since the nodes 21-23 discard messages from the node 24, as described above.

In such a situation, a user of the host 110 may recognize that the node 24 no longer appears to be present on the network 20. Thus, the user may transmit a message, such as a remote procedure call, to the node 24 using the secondary network address requesting the node 24 to return its primary network identifier. In response, the node 24 retrieves and returns the incorrect primary network identifier, which is displayed by the host 110. Upon viewing the incorrect primary network identifier, the user may discover the problem that is preventing communication with the node 24 via the correct primary network identifier. Thus, the user may submit a message, such as a remote procedure call, to the node 24 for changing the primary network identifier to the correct identifier. Such procedure call is preferably transmitted using the secondary network address such that the node 24 receives and responds to it. After the node 24 updates its primary network address to the correct address, communication with the other nodes 21-23 via the primary network address is enabled.

It is possible for the secondary network identifier to be changed similar to the techniques described above for the primary network identifier. However, in one exemplary embodiment, changes to the secondary network identifier are disabled. For example, the secondary network address may be stored in Read Only Memory (ROM). Such a feature helps to prevent both network identifiers from being incorrectly updated at the same time thereby helping to ensure that communication via at least one of the network identifiers is always enabled. In other embodiments, it is possible for the network 20 to be identified by any number of valid network identifiers.

In one exemplary embodiment, the routing tables 231-235 of the network 20 are periodically purged in order to force rediscovery of the network 20. Thus, if the topology of the network 20 has changed since discovery of the routes indicated by the purged entries, more efficient routes may be learned by the rediscovery. Note that all of the entries may be periodically purged. Alternatively, the entries may be purged on an entry-by-entry basis based on the age of each entry. For example, periodically, a routing table may be purged of entries that have an age above a specified threshold. Various other techniques for purging the routing tables are possible in other examples.

An exemplary configuration of the node 24 will be described in more detail hereafter in which the node 24 is configured to periodically purge its routing table 234. The other nodes 21-23 may be similarly configured.

Figure 11:
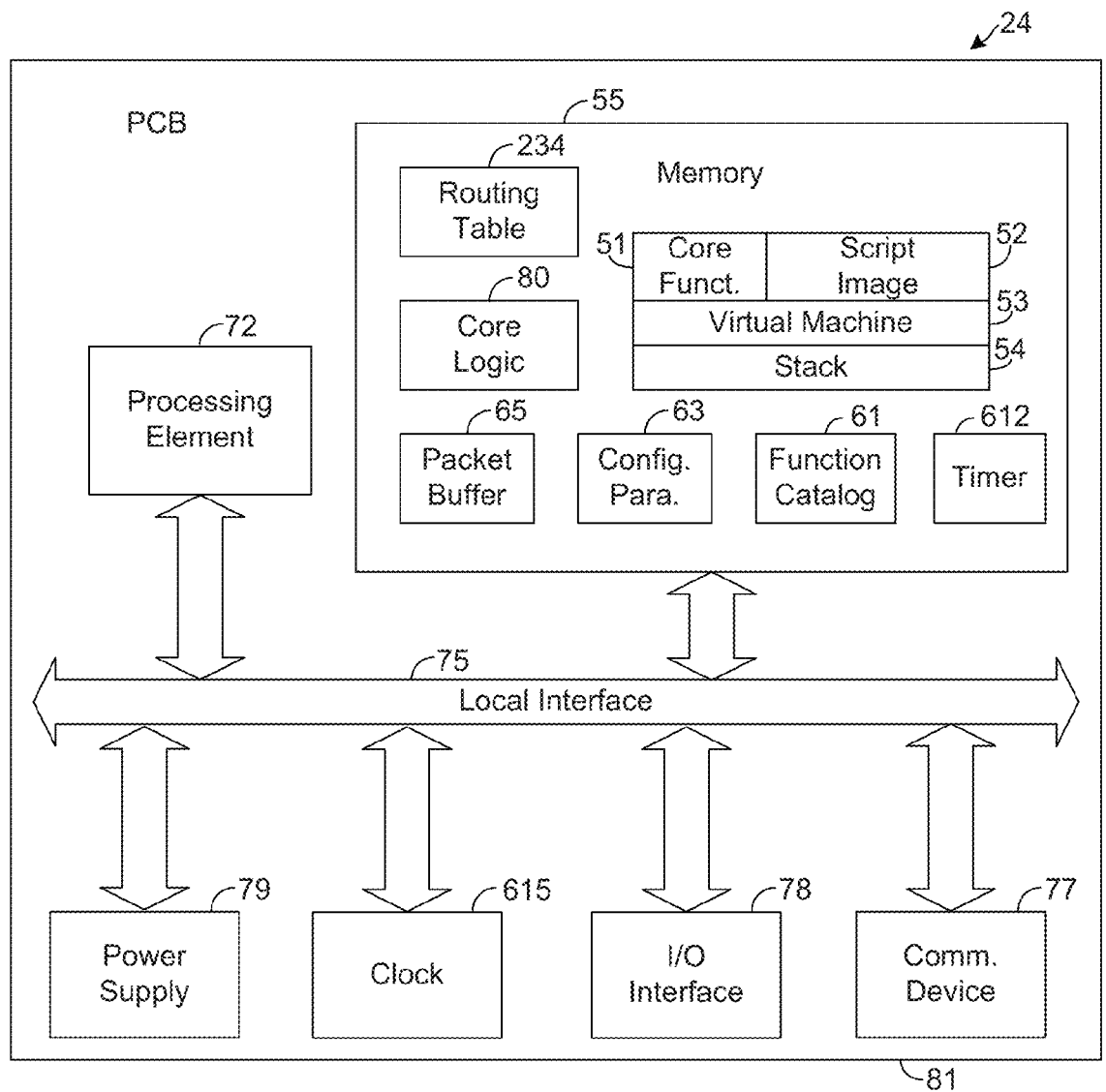
FIG. 11 is a block diagram illustrating an exemplary network node, such as is depicted in FIG. 1.

As shown by FIG. 11, the node 24 has a timer 612 that is configured to track time based on a clock 615. In one exemplary embodiment, the timer 612 is implemented in software and stored in the node's memory 55. However, the timer 612 may be implemented in hardware, software, firmware, or any combination thereof.

The configuration parameters 63 define a value, referred to hereafter as the "purge threshold," that is used to determine when to purge the routing table 234. In one exemplary embodiment, the timer 612 counts transitions of the clock 615 and compares the count to the purge threshold. When the count exceeds the purge threshold, the timer 612 generates an interrupt or otherwise informs the core logic 80. After informing the core logic 80 that the purge threshold has been exceeded, the timer 612 resets and repeats the process of counting transitions of the clock 615 and informing the core logic 80 when the purge threshold is exceeded.

When the purge threshold is exceeded, the core logic 80 purges the entries of the routing table 234. In one exemplary embodiment, the core logic 80 purges all of the entries of the routing table 234 such that the purged table 234 does not indicate any routes within the network 20. In other embodiments, the entries may be purged based on various factors, such as age of the entries, for example. For illustrative purposes, assume hereafter that the core logic 80 is configured to purge all entries of the routing table 234.

Purging the routing table 234 forces the node 24 to perform a route rediscovery when a message is to be transmitted to any destination previously indicated by a purged entry. For example, assume that the routing table 234 of the node 24 has an entry for the node 21. Such entry indicates that for any message destined for the node 21, the message should be transmitted to node 23, which routes the message to the node 21. When the node 24 is ready to transmit a message to the node 21, the node 24 uses such entry and includes the address of the node 23 as the next hop for the message. However, when the entry is purged by the core logic 80, the node 24 is forced to perform a route discovery for the node 21 the next time that the node 24 attempts to transmit a message to the node 21.

In this regard, when the node 24 is ready to transmit a message to the node 21 after purging of the routing table 234, the core logic 80 searches the routing table 234 for an entry having a destination address identifying the node 21. However, after purging, such an entry does not exist. Thus, the core logic 80 initiates a route discovery process for the node 24. An exemplary route discovery process is described above in which a route discovery message is transmitted when a node attempts to discover a new route to a particular destination. Such a route discovery process may be initiated by the node 24 to learn a data route. In performing such a route discovery, a new data route more efficient than the one previously indicated by the routing table 234 prior to the purging by the core logic 80 may be discovered. For example, a data route passing through fewer numbers of hops may be discovered after purging by the core logic 80.

In one exemplary embodiment, purging of the routing table 234 can be selectively disabled by a user. In this regard, the routing threshold can be established and/or updated by a user. For example, one of the core functions 51 may be used to change the routing threshold. In such an embodiment, a user may change the routing threshold by initiating a message, such as a remote procedure call, for calling such core function 51. The procedure call may include a new value for the routing threshold, which is defined by the user. The foregoing core function 51 may change the routing threshold to the new value when called. Thus, initiating the remote procedure call changes the routing threshold to the new value. However, other techniques for setting and/or changing the routing threshold are possible.

The user may lengthen the time between purging of the routing table 234 by increasing the routing threshold, and the user may shorten the time between purging of the routing table 234 by decreasing the routing threshold. In one exemplary embodiment, the timer 612 determines whether the count is equal to the threshold. If so, the timer 612 informs the core logic 80 that a purging of the routing table 234 is to be performed. However, if the routing threshold is set to a value of zero or less, then the count never equals the routing threshold unless the routing threshold is later updated to a value greater than zero. Thus, setting the routing threshold to a value of zero or less effectively disables purging of the routing table 234. In other embodiments, other techniques for disabling the purging of the routing table 234 are possible.

Disabling purging of a routing table can be beneficial for a variety of reasons. For example, if the nodes 21-24 of the network 20 are likely to be stationary, then it is unlikely that more efficient data routes can be learned by forcing a route rediscovery. In such a situation, the benefits of route rediscovery may be outweighed by the additional messaging, such as the communication of route discovery messages and responses thereto, caused by such rediscovery. Other reasons for disabling purging of a routing table are possible.

Note that the host 110 or other node of the network 20 can be used to view and/or change any of the configuration parameters 63, including the routing threshold and routing indicator described above. In this regard, as described above, a user may view various information about a node by selecting the node in window 307 (FIG. 6). In one exemplary embodiment, the user may provide an input, such as selection of a tool bar option or a menu option, for requesting a display of the configuration parameters 63 (FIG. 2) for a selected node. In response to such input, the core logic 152 of the host 110 transmits one or more remote procedure calls for retrieving the configuration parameters 63 of the selected node. When the selected node receives such a remote procedure call, the virtual machine 53 of the node calls a core function 51, which retrieves one or more configuration parameters 63 and returns the retrieved parameters 63 to the host 110, which then displays them to the user. In one exemplary embodiment, all of the configuration parameters are returned in response to a single remote procedure call. In another embodiment, each remote procedure call specifies a subset (at least one) of the configuration parameters such that multiple remote procedure calls are used if all of the configuration parameters 63 are to be returned. If desired, the user may specify which of the configuration parameters 63 of the selected node are to be returned.

The user can view and, if desired, change any of the configuration parameters 63 retrieved from the selected node and displayed by the host 110. If a configuration parameter 63 is changed by user input, the core logic 152 of the host 110 is configured to transmit a remote procedure call for changing the parameter. Such call identifies the changed configuration parameter 63 and includes the new value for the changed configuration parameter 63. The remote procedure call is received by the selected node. In response to the remote procedure call, the virtual machine 53 of the selected node calls a core function 51, which updates the stored configuration parameters 63 based on the configuration parameter value or values in the remote procedure call. Any of the configuration parameters 63 may be updated in such manner. In addition, other techniques for updating the configuration parameters 63 are possible. For example, the aforementioned core function 51 for updating one or more configuration parameters 63 may be called by a function call in the script image 52 rather than by a remote procedure call.

Several of the embodiments have been described herein in the context of wireless sensor networks. It should be emphasized that the communication and networking techniques described herein may be applied to other types of networks.

Now, therefore, the following is claimed:

1. A system for displaying node information in a wireless mesh network, the system comprising:
   a plurality of nodes forming the wireless mesh network, one of the plurality of nodes configured to receive from the wireless mesh network a plurality of scripts uploaded to the one node through the wireless mesh network, the one node further configured to store each of the scripts, wherein each of the scripts defines a respective function for the one node;
   memory configured to store a list of the plurality of nodes; and
   logic remote from the one node, the logic configured to display the list and to receive a first user input selecting the one node, the logic further configured to display a plurality of function identifiers in response to the first user input, each of the function identifiers identifying a respective one of the scripts stored at the one node, the logic further configured to receive a second user input selecting one of the function identifiers and to transmit a remote procedure call through the wireless mesh network to the one node in response to the second user input, wherein a virtual machine of the one node is configured to run the script identified by the selected function identifier in response to the remote procedure call, wherein the script identified by the selected function identifier comprises bytecode, and wherein the virtual machine is configured to run the script identified by the selected function identifier by interpreting the bytecode.

2. The system of claim 1, wherein the logic is configured to display the list in a first window of a graphical user interface and to display the function identifiers in a second window of the graphical user interface.

3. The system of claim 1, wherein the logic is configured to receive a third user input selecting one of the function identifiers, and wherein the logic is configured to display the script identified by the function identifier selected by the third user input.

4. The system of claim 1, wherein the logic is configured to display the function identifiers as selectable hyperlinks in response to the first user input.

5. The system of claim 1, wherein the logic is configured to retrieve the function identifiers from the one node in response to the first user input.

6. The system of claim 1, wherein the logic is configured to display a respective node identifier for each node in said list and a respective value indicative of a quality of a respective communication channel through the wireless mesh network for each node in the list.

7. A method for displaying node information in a wireless mesh network having a plurality of nodes, the method comprising the steps of:
   receiving at one of the plurality of nodes a plurality of scripts uploaded to the one node through the wireless mesh network;
   storing at the one node each of the scripts, wherein each of the scripts defines a respective function for the one node;
   displaying a list of the plurality of nodes via a graphical user interface at a location remote from the one node;
   receiving, at the location remote from the one node, a first user input selecting the one node;
   displaying, in response to the first user input, a plurality of function identifiers via the graphical user interface at the location remote from the one node, each of the function identifiers identifying a respective one of the scripts;
   receiving, at the location remote from the one node, a second user input selecting one of the function identifiers;
   transmitting a remote procedure call through the wireless mesh network to the one node in response to the second user input; and
   running on a virtual machine of the one node the script identified by the selected function identifier in response to the remote procedure call, wherein the script identified by the selected function identifier comprises bytecode, and wherein the running step comprises the step of interpreting the bytecode via the virtual machine.

8. The method of claim 7, further comprising the steps of:
   receiving a third user input selecting one of the function identifiers; and
   displaying the script identified by the function identifier selected by the third user input.

9. The method of claim 7, wherein the displaying the plurality of function identifiers step comprises the step of displaying the function identifiers as selectable hyperlinks in response to the first user input.

10. The method of claim 7, further comprising the step of retrieving the function identifiers from the one node in response to the first user input.

11. The method of claim 7, wherein the displaying the list of the nodes step comprises the steps of:
    displaying, via the graphical user interface, a respective node identifier for each node in the list; and
    displaying, via the graphical user interface, a respective value indicative of a quality of a respective communication channel through the wireless mesh network for each node in the list.

\* \* \* \* \*